(12) United States Patent
Clark et al.

(10) Patent No.: US 6,903,660 B2
(45) Date of Patent: Jun. 7, 2005

(54) INDUCTIVELY-COUPLED SYSTEM FOR RECEIVING A RUN-IN TOOL

(75) Inventors: Brian Clark, Sugar Land, TX (US); John Hunka, Sugar Land, TX (US); Mark T. Frey, Sugar Land, TX (US); David L. Smith, Stafford, TX (US); Dhananjay Ramaswamy, Stafford, TX (US); Anthony Collins, Houston, TX (US); Stephen Bonner, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 309 days.

(21) Appl. No.: 10/355,613

(22) Filed: Jan. 30, 2003

(65) Prior Publication Data

US 2003/0137302 A1 Jul. 24, 2003

Related U.S. Application Data

(62) Division of application No. 09/576,271, filed on May 22, 2000, now Pat. No. 6,577,244.

(51) Int. Cl.$^7$ ............................................. E21B 23/00
(52) U.S. Cl. ............................... 340/854.8; 340/854.6; 166/381; 324/333; 324/339
(58) Field of Search ......................... 166/381; 340/854.8, 340/854.6; 324/333, 339

(56) References Cited

U.S. PATENT DOCUMENTS

| | | |
|---|---|---|
| 3,746,106 A | 7/1973 | McCullough et al. |
| 4,041,780 A | 8/1977 | Angehrn |
| 4,047,430 A | 9/1977 | Angehrn |
| 4,296,321 A | 10/1981 | Blincow et al. |
| 4,684,946 A | 8/1987 | Issenmann |
| 4,806,928 A | 2/1989 | Veneruso |
| 4,879,463 A | 11/1989 | Wraight et al. |

(Continued)

FOREIGN PATENT DOCUMENTS

| | | |
|---|---|---|
| EP | 0 505 260 A3 | 9/1992 |
| GB | 2 337 546 A | 11/1999 |
| WO | WO 97/08425 | 3/1997 |
| WO | WO 01/04662 A1 | 1/2001 |
| WO | WO 01/06085 A1 | 1/2001 |

OTHER PUBLICATIONS

"Logging while Tripping Cuts Time to Run Gamma Ray," *Oil and Gas J.*, pp. 65–66 (Jun. 10, 1996).

*Primary Examiner*—Albert K. Wong
(74) *Attorney, Agent, or Firm*—Kevin P. McEnaney; Brigitte L. Echols; Dale Gaudier

(57) ABSTRACT

Systems and methods for downhole communication and measurement utilizing an improved metallic tubular having an elongated body with tubular walls and a central bore adapted to receive a run-in tool. The tubular including slotted stations to provide through-tubular signal transmission and/or reception. Hydraulic isolation between the interior and exterior of the tubular is provided by pressure barrier means at the slotted stations. Sensors and/or sources are mounted on the run-in tool, which is adapted for transmission through a drill string to engage within the tubular in alignment with the slotted stations. A run-in tool configuration includes a modulator for real-time wireless communication with the surface and/or remote downhole tools. A tubular and run-in tool configuration also includes inductive couplers for wireless signal data transfer. A method for measuring a formation characteristic utilizing a run-in tool adapted with an interchangeable end segment for multi-mode downhole transport. Methods for sealing an opening on the surface of a tubular having an elongated body with tubular walls and a central bore.

38 Claims, 17 Drawing Sheets

U.S. PATENT DOCUMENTS

| | | |
|---|---|---|
| 4,899,112 A | 2/1990 | Clark et al. |
| 4,901,069 A | 2/1990 | Veneruso |
| 4,914,637 A | 4/1990 | Goodsman |
| 4,949,045 A | 8/1990 | Clark et al. |
| 4,951,267 A | 8/1990 | Chang et al. |
| 5,050,675 A | 9/1991 | Upchurch |
| 5,123,492 A | 6/1992 | Lizanec, Jr. |
| 5,168,942 A | 12/1992 | Wydrinski |
| 5,250,806 A | 10/1993 | Rhein-Knudsen et al. |
| 5,372,208 A | 12/1994 | Mefferd |
| 5,455,573 A | 10/1995 | Delatorre |
| 5,560,437 A | 10/1996 | Dickel et al. |
| 5,563,512 A | 10/1996 | Mumby |
| 5,589,825 A | 12/1996 | Pomerleau |
| 5,594,343 A | 1/1997 | Clark et al. |
| 5,939,885 A | 8/1999 | McClure et al. |
| 5,944,124 A | 8/1999 | Pomerleau et al. |
| 5,988,300 A | 11/1999 | Pomerleau |
| 6,064,210 A | 5/2000 | Sinclair |
| 6,288,548 B1 | 9/2001 | Thompson et al. |
| 6,297,639 B1 | 10/2001 | Clark et al. |
| 6,483,310 B1 | 11/2002 | Meador |
| 6,566,881 B2 | 5/2003 | Omeragic et al. |
| 6,577,244 B1 | 6/2003 | Clark et al. |
| 6,614,227 B2 | 9/2003 | Ookubo |
| 6,836,218 B2 * | 12/2004 | Tabanou et al. ......... 340/854.6 |
| 2002/0057210 A1 | 5/2002 | Frey et al. |
| 2002/0079889 A1 | 6/2002 | Frey et al. |

* cited by examiner

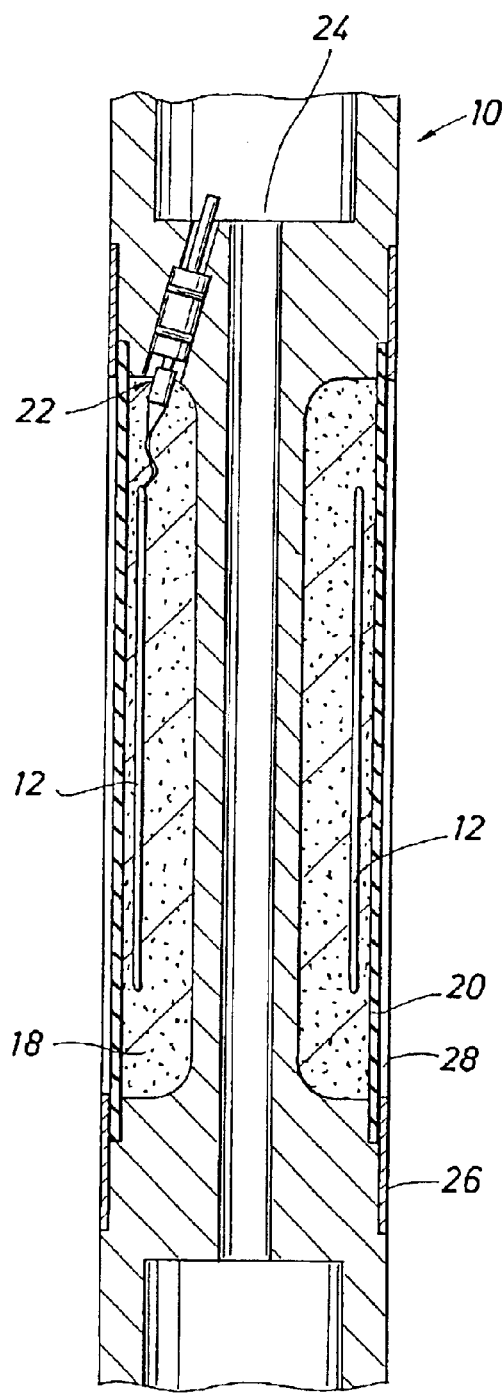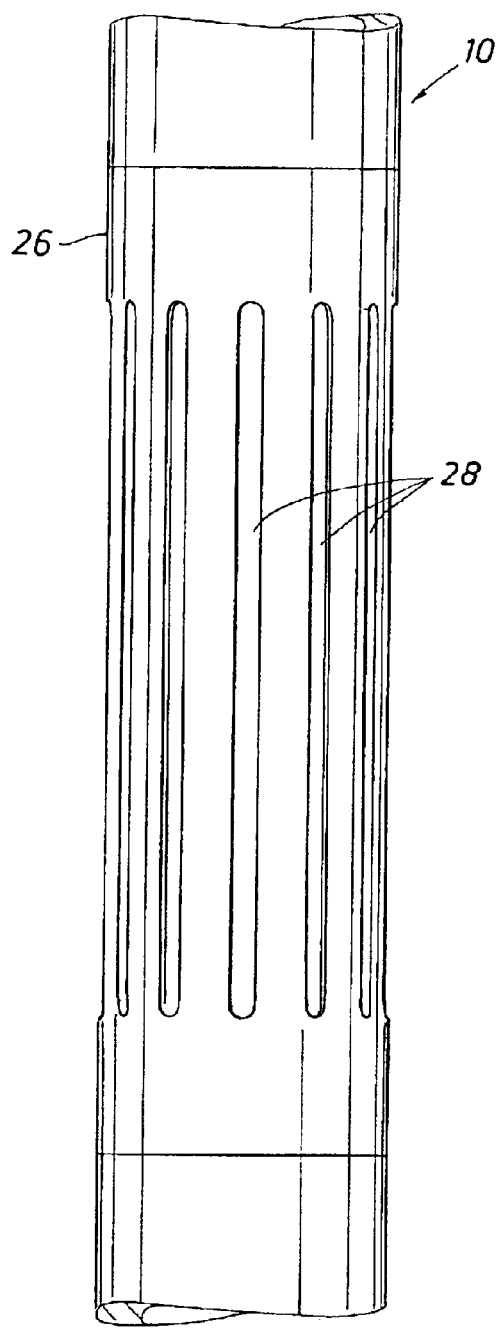

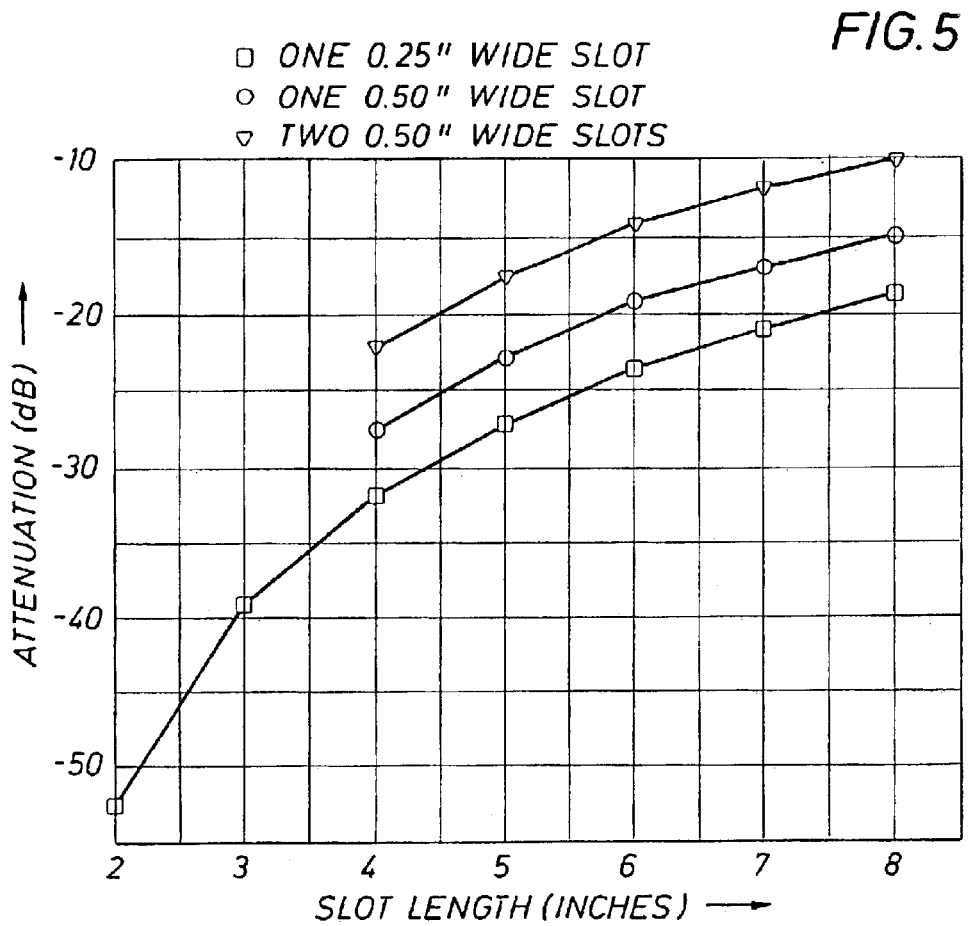
FIG.5
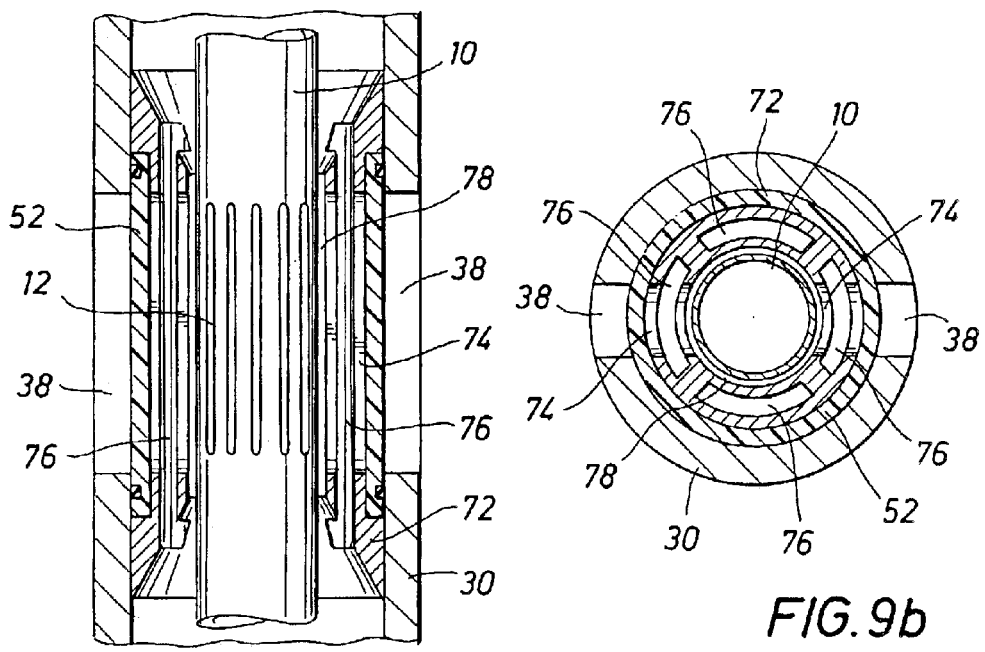
FIG.9a
FIG.9b

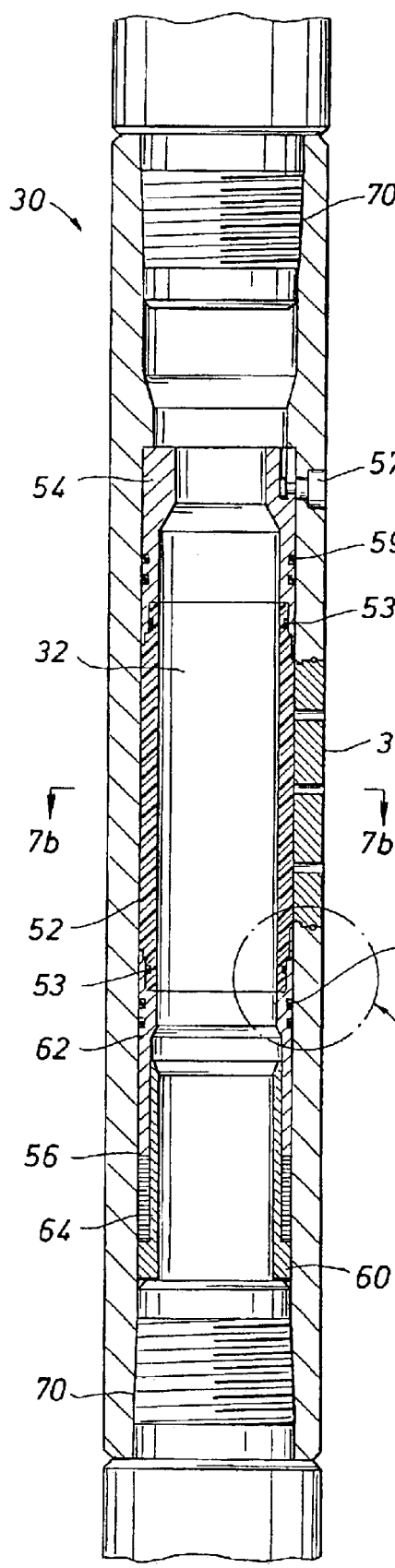
FIG. 7a
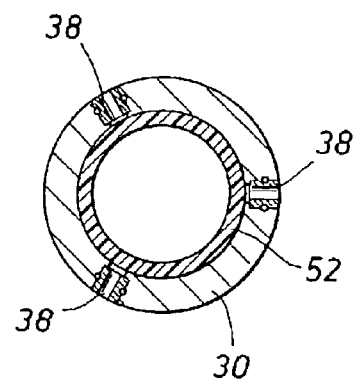
FIG. 7b
FIG. 7a-1
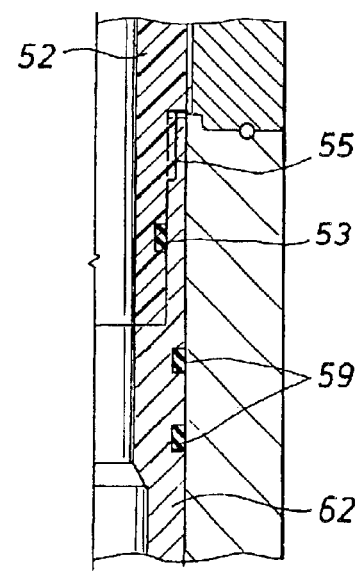

*FIG.10*
*FIG.11*
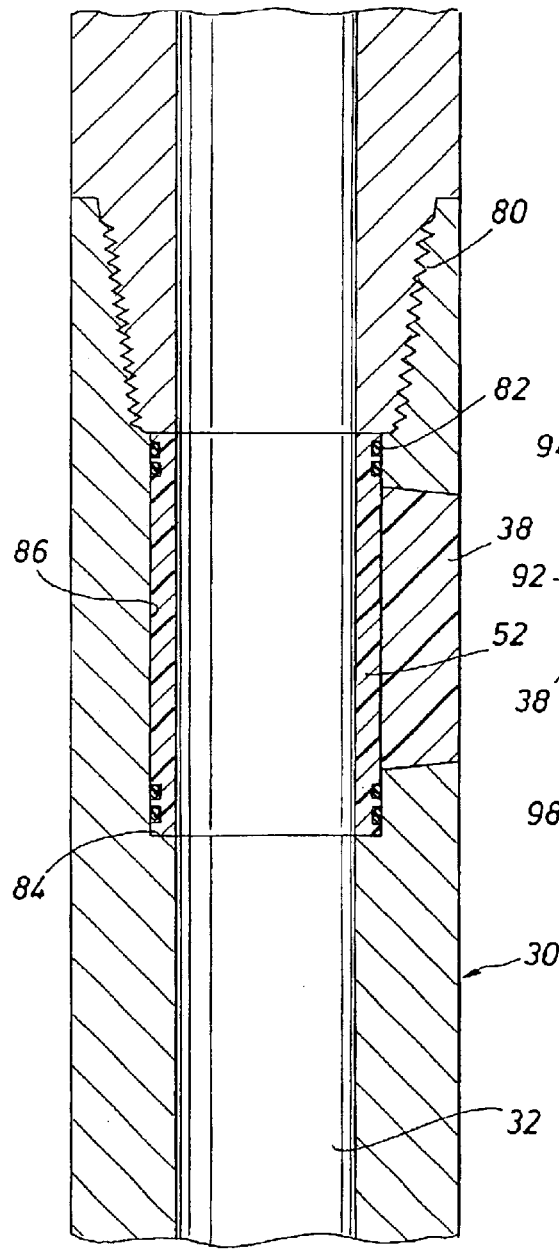
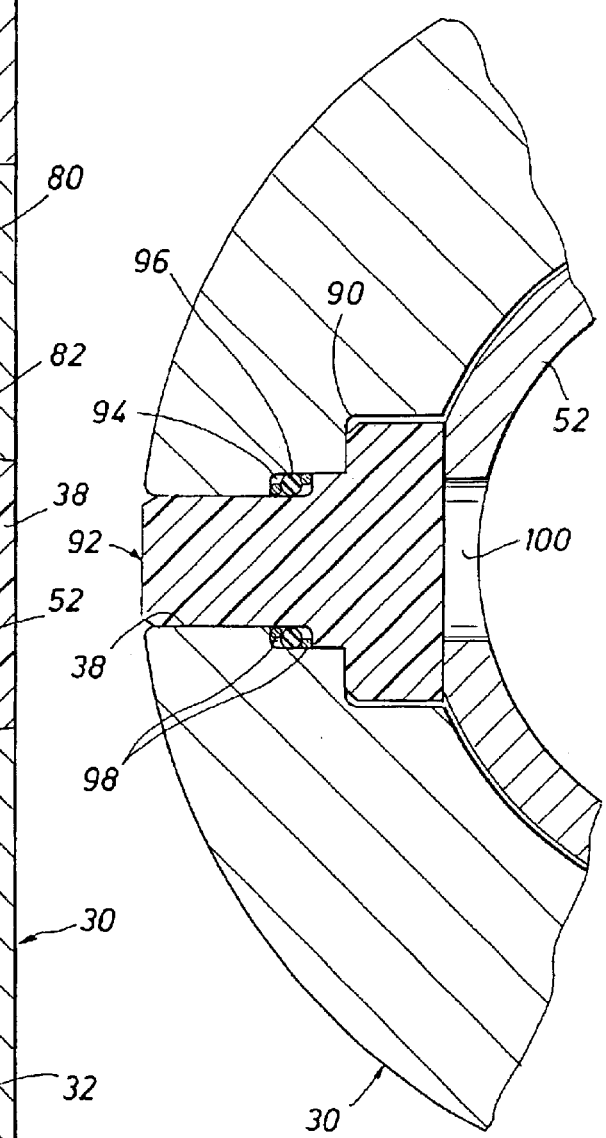

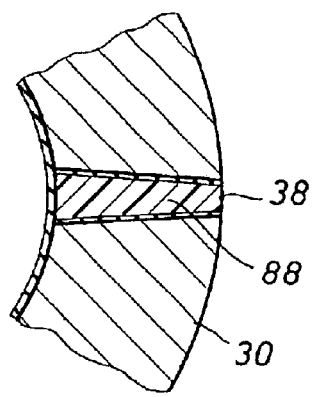
FIG.12a
FIG.12b-2   FIG.12b-1   FIG.12b-3
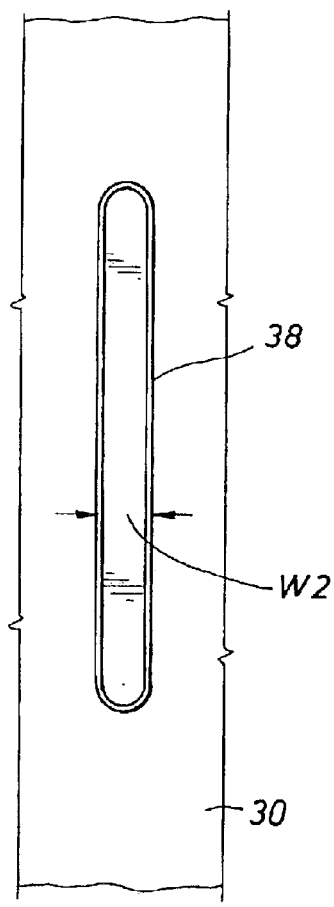 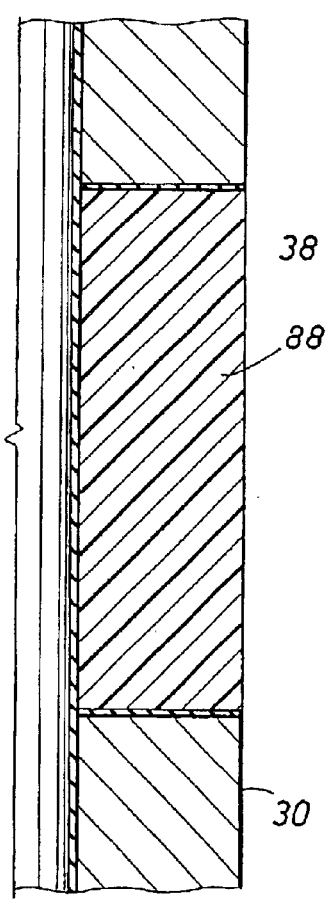 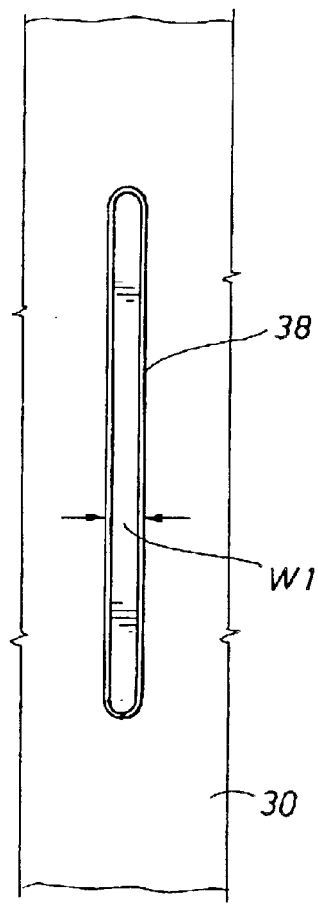

FIG. 17
FIG. 18
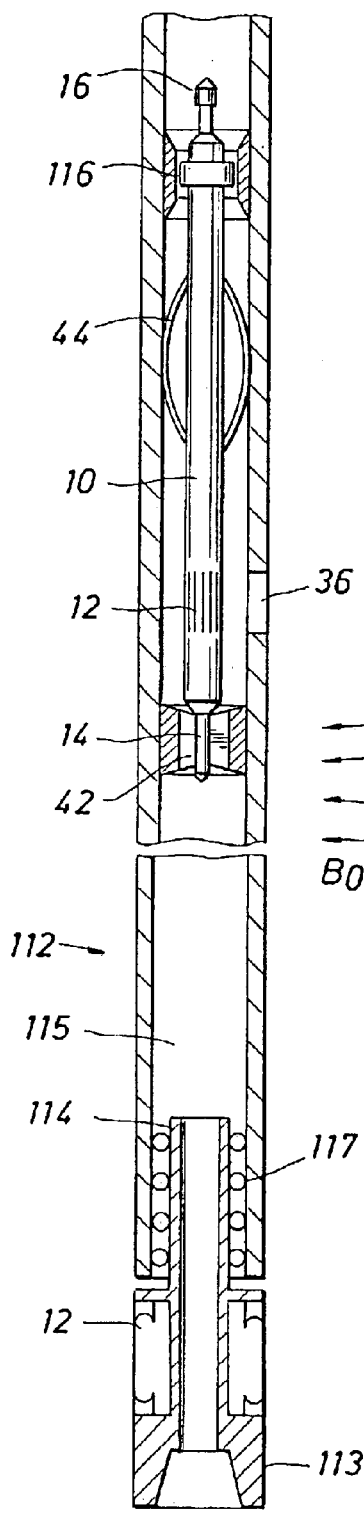
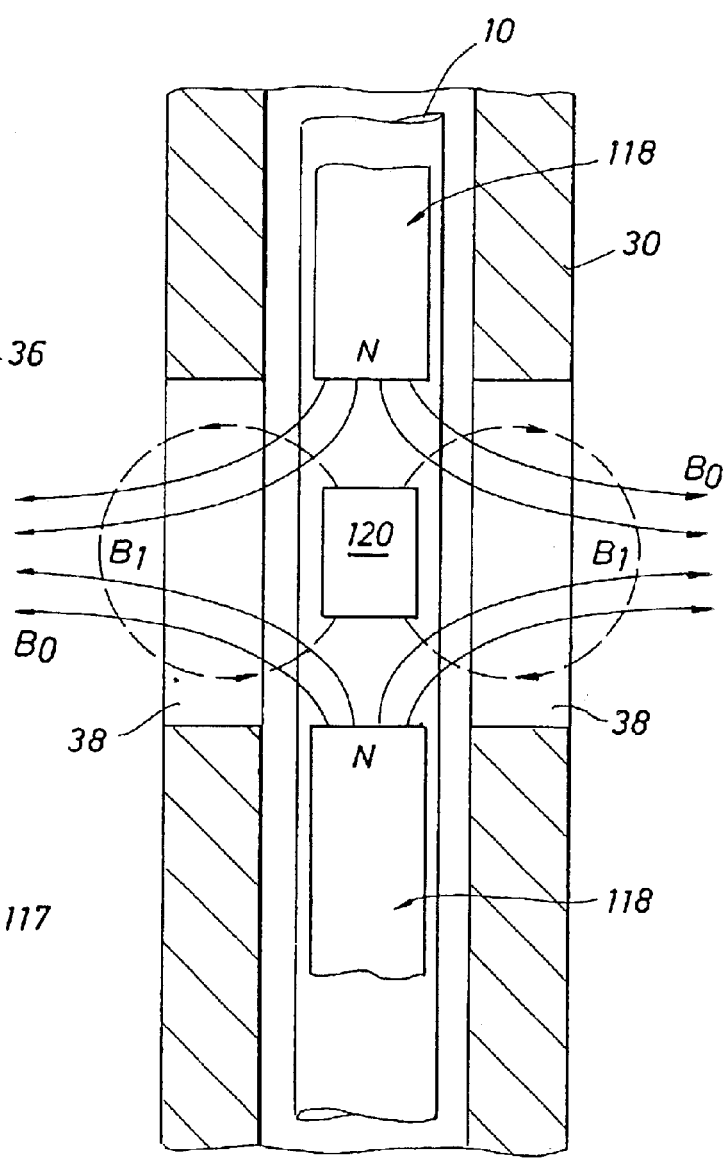

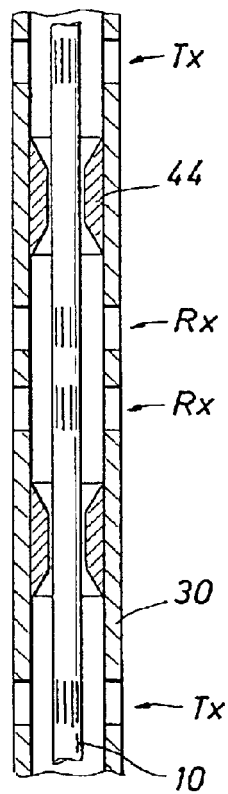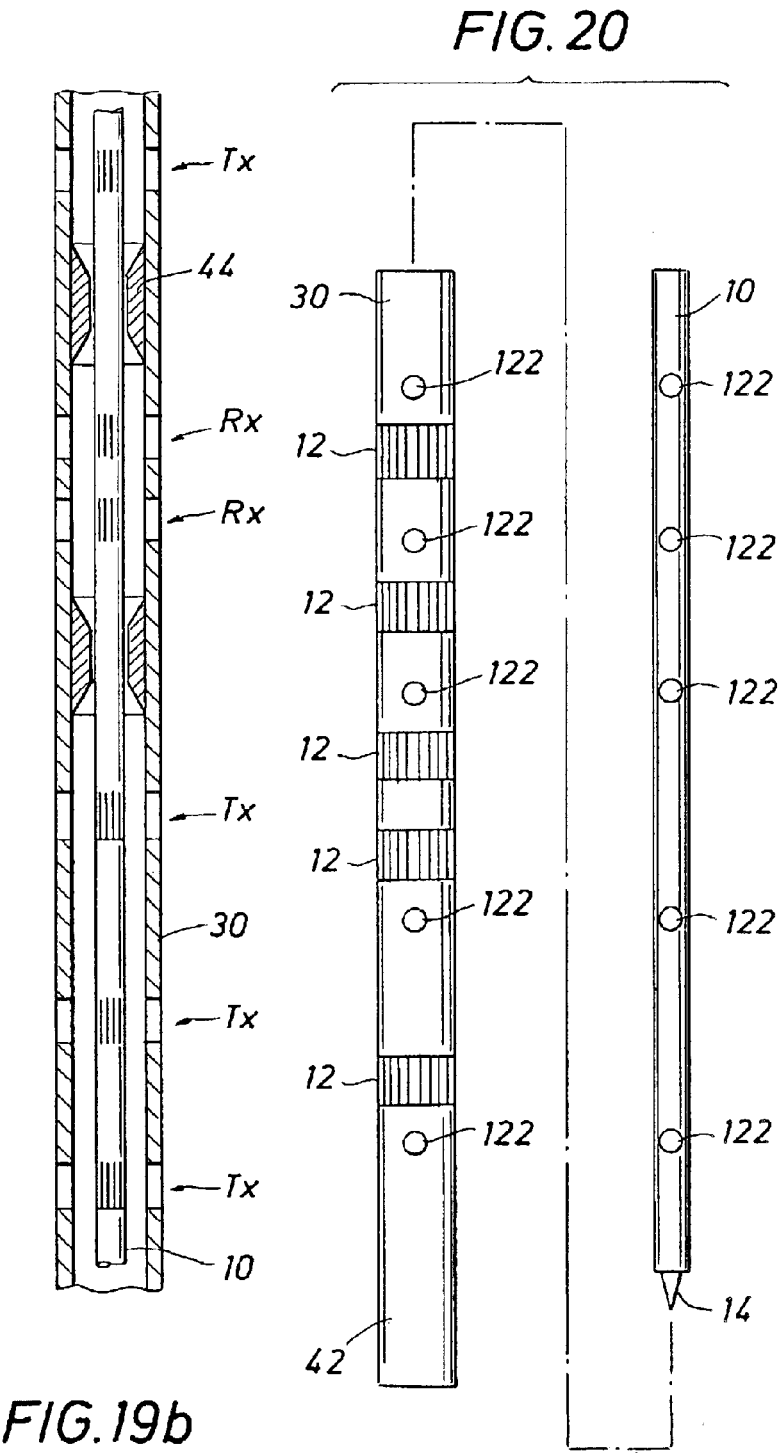

INDUCTIVELY-COUPLED SYSTEM FOR RECEIVING A RUN-IN TOOL

CROSS-REFERENCES

The present application is a divisional of U.S. patent application Ser. No. 09/576,271, filed May 22, 2000, now U.S. Pat. No. 6,577,244.

1. BACKGROUND OF THE INVENTION

1.1 Field of the Invention

This invention relates generally to investigation of subsurface earth formations, systems and methods for transmitting and/or receiving a signal through a metallic tubular, and, more particularly, to a device for receiving a run-in tool.

1.2 Description of Related Art

Resistivity and gamma-ray logging are the two formation evaluation measurements run most often in well logging. Such measurements are used to locate and evaluate the properties of potential hydrocarbon bearing zones in subsurface formations. In many wells, they are the only two measurements performed, particularly in low cost wells and in surface and intermediate sections of more expensive wells.

These logging techniques are realized in different ways. A well tool, comprising a number of transmitting and detecting devices for measuring various parameters, can be lowered into a borehole on the end of a cable, or wireline. The cable, which is attached to some sort of mobile processing center at the surface, is the means by which parameter data is sent up to the surface. With this type of wireline logging, it becomes possible to measure borehole and formation parameters as a function of depth, i.e., while the tool is being pulled uphole.

Some wells may not be logged because wireline logging is too expensive, when rig time is included in the total cost. Conditioning the well for wireline logging, rigging up the wireline tools, and the time to run the wireline tools in and out require rig time. Horizontal or deviated wells also present increased cost and difficulty for the use of wireline tools.

An alternative to wireline logging techniques is the collection of data on downhole conditions during the drilling process. By collecting and processing such information during the drilling process, the driller can modify or correct key steps of the operation to optimize performance. Schemes for collecting data of downhole conditions and movement of the drilling assembly during the drilling operation are known as Measurement While Drilling (MWD) techniques. Similar techniques focusing more on measurement of formation parameters than on movement of the drilling assembly are know as Logging While Drilling (LWD). As with wireline logging, the use of LWD and MWD tools may not be justified due to the cost of the equipment and the associated service since the tools are in the hole for the entire time it takes to drill the section.

Logging While Tripping (LWT) presents a cost-effective alternative to LWD and MWD techniques. In LWT, a small diameter "run-in" tool is sent downhole through the drill pipe, at the end of a bit run, just before the drill pipe is pulled. The run-in tool is used to measure the downhole physical quantities as the drill string is extracted or tripped out of the hole. Measured data is recorded into tool memory versus time during the trip out. At the surface, a second set of equipment records bit depth versus time for the trip out, and this allows the measurements to be placed on depth.

U.S. Pat. No. 5,589,825 describes a LWT technique incorporating a logging tool adapted for movement through a drillstring and into a drilling sub. The '825 patent describes a sub incorporating a window mechanism to permit signal communication between a housed logging tool and the wellbore. The window mechanism is operable between an open and closed position. A disadvantage of the proposed apparatus is that the open-window mechanism directly exposes the logging tool to the rugose and abrasive borehole environment, where formation cuttings are likely to damage the logging tool and jam the window mechanism. Downhole conditions progressively become more hostile at greater depths. At depths of 5,000 to 8,000 meters, bottom hole temperatures of 260° C. and pressures of 170 Mpa are often encountered. This exacerbates degradation of external or exposed logging tool components. Thus, an open-window structure is impractical for use in a downhole environment.

UK Patent Application GB 2337546A describes a composite structure incorporated within a drill collar to permit the passage of electromagnetic energy for use in measurements during the drilling operation. The '546 application describes a drill collar having voids or recesses with embedded composite covers. A disadvantage of the apparatus proposed by the '546 application is the use of composite materials as an integral part of the drill collar. Fatigue loading (i.e., the bending and rotating of the drill pipe) becomes an issue in drilling operations. When the drill pipe is subjected to bending or torsion, the shapes of the voids or recesses change, resulting in stress failure and poor sealing. The differences in material properties between the metal and composite covers are difficult to manage properly where the composite and metal are required to act mechanically as one piece, such as described in the '546 application. Thus, the increased propensity for failure under the extreme stresses and loading encountered during drilling operations makes implementation of the described structure impractical.

U.S. Pat. Nos. 5,988,300 and 5,944,124 describe a composite tube structure adapted for use in a drillstring. The '300 and '124 patents describe a piecewise structure including a composite tube assembled with end-fittings and an outer wrapping connecting the tube with the end-fittings. In addition to high manufacturing costs, another disadvantage of this structure is that the multi-part assembly is more prone to failure under the extreme stresses encountered during drilling operations.

U.S. Pat. No. 5,939,885 describes a well logging apparatus including a mounting member equipped with coil antennas and housed within a slotted drill collar. However, the apparatus is not designed for LWT operations. U.S. Pat. Nos. 4,041,780 and 4,047,430 describe a logging instrument that is pumped down into a drill pipe for obtaining logging samples. However, the system proposed by the '780 and '430 patents requires the withdrawal of the entire drill string (for removal of the drill bit) before any logging may be commenced. Thus, implementation of the described system is impractical and not cost effective for many operations.

U.S. Pat. No. 5,560,437 describes a telemetry method and apparatus for obtaining measurements of downhole parameters. The '437 patent describes a logging probe that is ejected into the drill string. The logging probe includes a sensor at one end that is positioned through an aperture in a special drill bit at the end of the drill string. As such, the sensor has direct access to the drill bore. A disadvantage of the apparatus proposed by the '437 patent is the sensor's direct exposure to the damaging conditions encountered downhole. The use of a small probe protruding through a small aperture is also impractical for resistivity logging.

U.S. Pat. No. 4,914,637 describes a downhole tool adapted for deployment from the surface through the drill string to a desired location in the conduit. A modulator on the tool transmits gathered signal data to the surface. U.S. Pat. No. 5,050,675 (assigned to the present assignee) describes a perforating apparatus incorporating an inductive coupler configuration for signal communication between the surface and the downhole tool. U.S. Pat. No. 5,455,573 describes an inductive coupling device for coaxially arranged downhole tools. Downhole techniques have also been proposed utilizing slotted tubes. U.S. Pat. No. 5,372,208 describes the use of slotted tube sections as part of a drill string to sample ground water during drilling. However, none of these proposed systems relate to through-tubing measurement or signal transfer.

It is desirable to obtain a simplified and reliable LWT system and methods for locating and evaluating the properties of potential hydrocarbon bearing zones in subsurface formations. Thus, there remains a need for an improved LWT system and methods for transmitting and/or receiving a signal through an earth formation. There also remains a need for a technique to measure the characteristics of a subsurface formation with the use of a versatile apparatus capable of providing LWT, LWD or wireline measurements. Yet another remaining need is that of effective techniques for sealing apertures on the surface of tubular members used for downhole operations.

2. SUMMARY OF THE INVENTION

Systems and methods are provided utilizing an improved downhole tubular having an elongated body with tubular walls and a central bore adapted to receive a run-in tool. The tubular has at least one slot formed in its wall to provide for continuous passage of a signal (e.g., electromagnetic energy) that is generated or received respectively by a source or sensor mounted on the run-in tool. The tubular also includes a pressure barrier within the central bore to maintain hydraulic integrity between the interior and exterior of the tubular at the slotted station. The tubular and run-in tool combinations provide systems and methods for downhole signal communication and formation measurement through a metallic tubular. A technique for measuring a formation characteristic utilizing a run-in tool adapted with a multimode end segment is provided. Techniques are also provided for effectively sealing openings on the surface of tubular members.

In one aspect of the invention, run-in tools equipped with electronics, sensors, sources, memory, power supply, CPU, batteries, ports, centralizers, and a clock, are provided for deployment through and engagement within a downhole tubular.

In another aspect of the invention, antenna configurations of the run-in tool are provided.

In another aspect of the invention, slotted-tubular/run-in tool configurations are provided for downhole signal communication and measurement.

In another aspect of the invention, pressure barrier configurations are provided for maintaining the hydraulic integrity of the tubulars at the slotted stations.

In another aspect of the invention, slot-insert configurations are provided for the slotted tubular.

In another aspect of the invention, antenna-shielding configurations are provided for focusing the electromagnetic energy generated by the antennas of the run-in tool.

In another aspect of the invention, a run-in tool including a modulator for real-time signal/data communication is provided.

In another aspect of the invention, a run-in tool configuration for wireless communication with a remote downhole tool is provided.

In another aspect of the invention, a run-in tool and tubular configuration for determining formation porosity utilizing nuclear magnetic resonance techniques is provided.

In another aspect of the invention, run-in tool and tubular configurations for determining formation density utilizing gamma-ray techniques are provided.

In another aspect of the invention, run-in tool and tubular configurations for determining formation resistivity utilizing electromagnetic propagation techniques are provided.

In another aspect of the invention, run-in tool and tubular configurations including inductive couplers are provided for downhole signal communication and measurement.

3. BRIEF DESCRIPTION OF THE DRAWINGS

Other aspects and advantages of the invention will become apparent upon reading the following detailed description and upon reference to the drawings in which:

FIG. 2a is a cross-sectional view of a run-in tool showing an antenna with associated wiring and passages in accord with the invention.

FIG. 2b is a schematic diagram of a shield structure surrounding an antenna on the run-in tool in accord with the invention.

FIG. 5 graphically illustrates the relationship between the slot dimensions of a tubular segment of the invention and the attenuation of passing electromagnetic energy.

Figure 6:
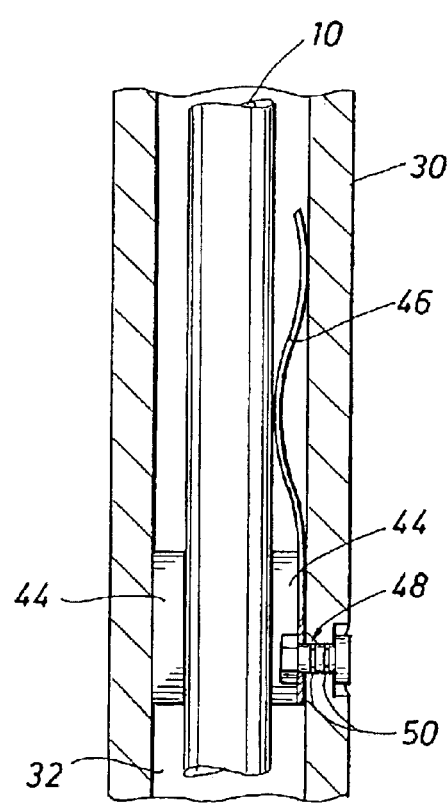

FIG. 6 is a schematic diagram of a run-in tool with a centralizer configuration in accord with the invention.

FIG. 7a is a cross-sectional view of a tubular member with a pressure barrier configuration in accord with the invention.

FIG. 7b is a cross-sectional view of a three-slotted tubular member of FIG. 7a along line A—A.

Figure 8A:
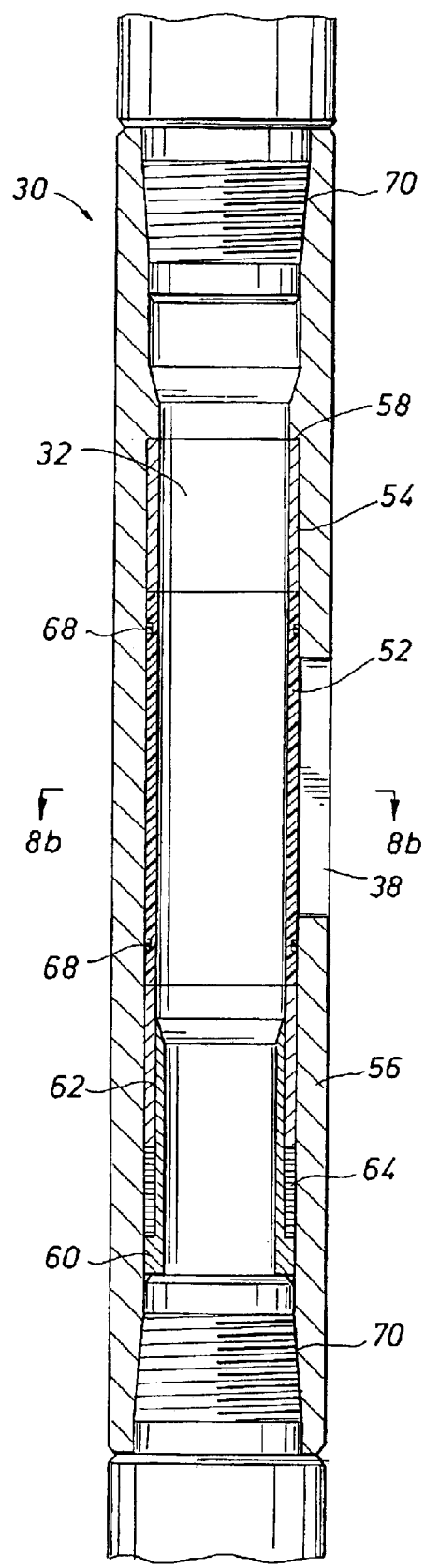

FIG. 8a is a cross-sectional view of a tubular member with another pressure barrier configuration in accord with the invention.

Figure 8B:
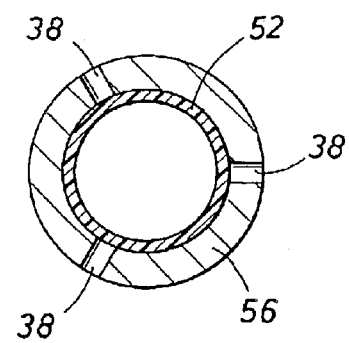

FIG. 8b is a cross-sectional view of a three-slotted tubular member of FIG. 8a along line B—B.

FIG. 9a is a cross-sectional view of a run-in tool positioned in alignment with a pressure barrier configuration in accord with the invention.

FIG. 9b is a top view of the run-in tool and pressure barrier configuration of FIG. 9a.

FIG. 10 is a cross-sectional view of a pressure barrier and tubular member configuration in accord with the invention.

FIG. 11 is a cross-sectional view of a slotted tubular member with an insert, seal, and retaining sleeve in accord with the invention.

FIGS. 12a and 12b are cross-sectional views and cutaway perspectives of a slotted tubular station with a tapered slot and a corresponding tapered insert in accord with the invention.

Figure 13A:
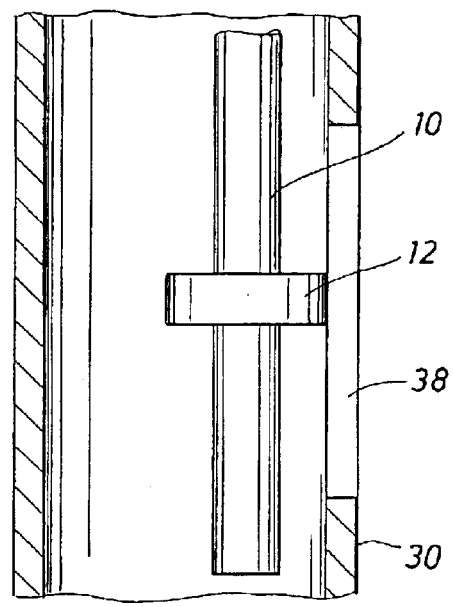

FIG. 13a is a schematic diagram of a run-in tool and antenna eccentered within a tubular member in accord with the invention.

Figure 13B:
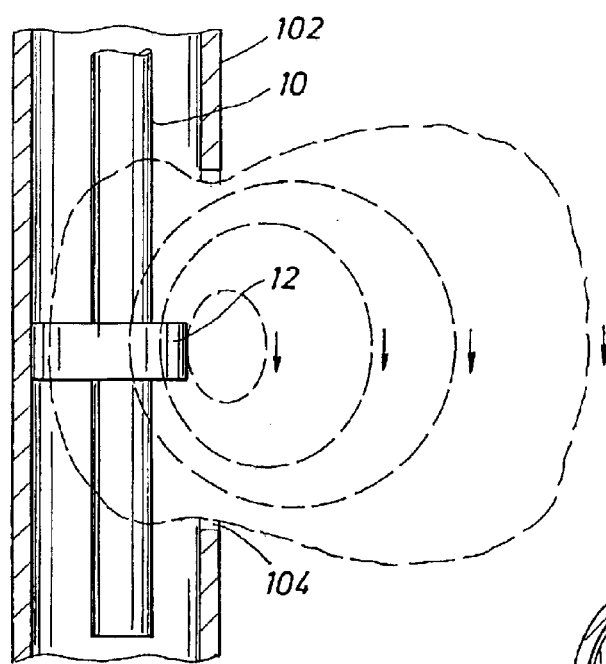
Figure 13C:
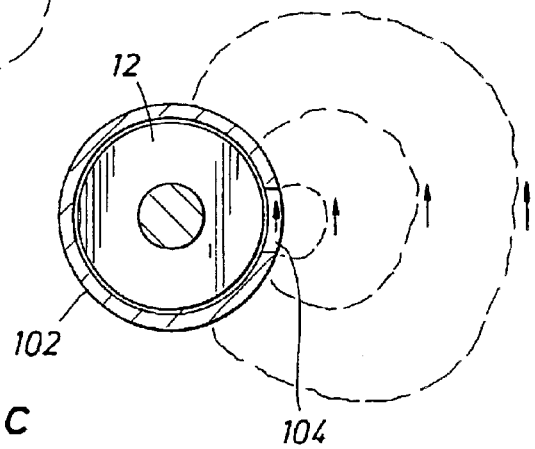

FIGS. 13b and 13c are schematic diagrams of a run-in tool and antenna surrounded by a focusing shield and respectively showing the shield's effect on the magnetic and electric fields in accord with the invention.

Figure 14:
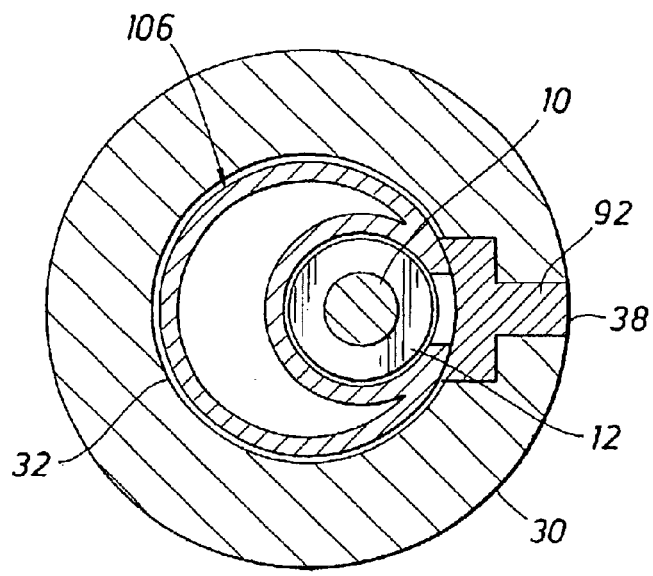

FIG. 14 is a top view of a shielding structure formed within the bore of the tubular member in accord with the invention.

Figure 15:
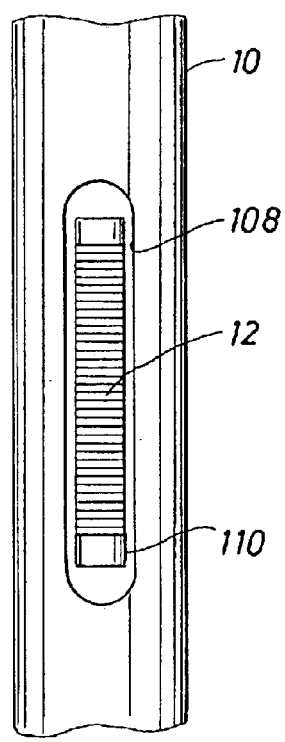

FIG. 15 is a schematic diagram of a shielding structure formed by a cavity within the run-in tool in accord with the invention.

Figure 16:
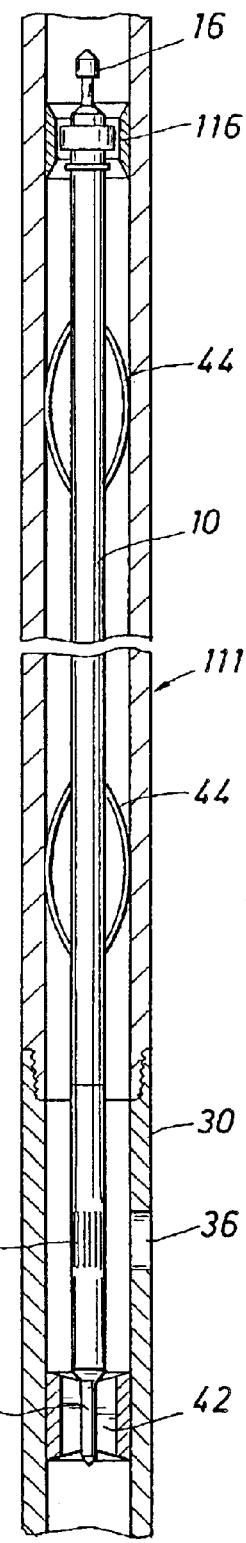

FIG. 16 is a schematic diagram of a run-in tool including a modulator engaged within a tubular member in accord with the invention.

FIG. 17 is a schematic diagram of the run-in tool configuration of FIG. 16 as used for real-time wireless communication with a remote downhole tool in accord with invention.

FIG. 18 is a schematic diagram of a run-in tool configuration for porosity measurements utilizing magnetic nuclear resonance techniques in accord with the invention.

FIGS. 19a and 19b are schematic diagrams of run-in tool antenna configurations within tubular members in accord with the invention.

FIG. 20 shows schematic diagrams of a tubular member and run-in tool configuration with inductive couplers in accord with the invention.

Figure 21A:
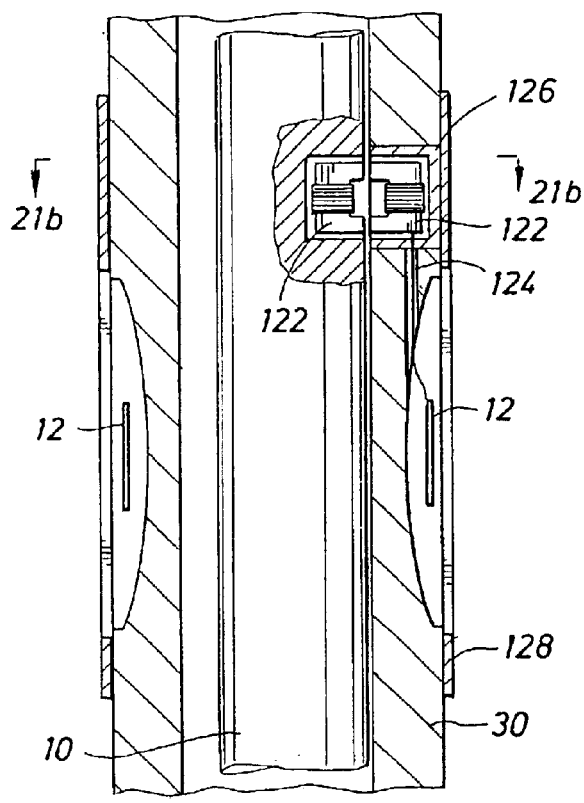
Figure 21B:
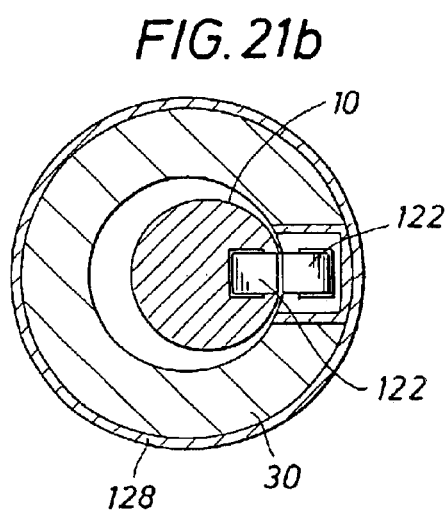

FIG. 21 shows a top view and a schematic diagram and of an eccentered run-in tool and tubular member with inductive couplers in accord with the invention.

Figure 22A:
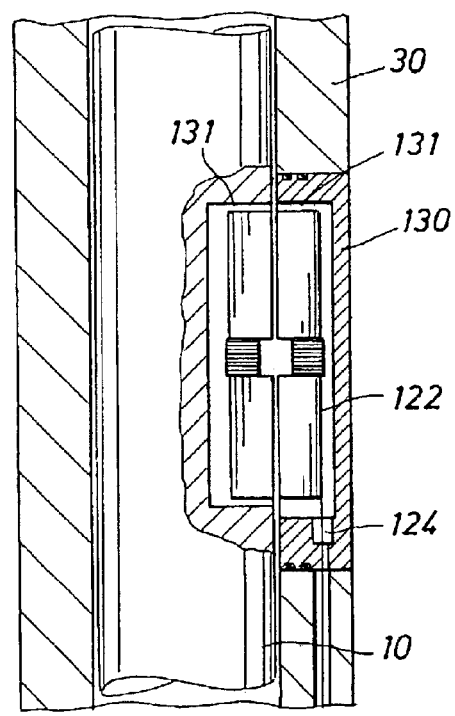
Figure 22B:
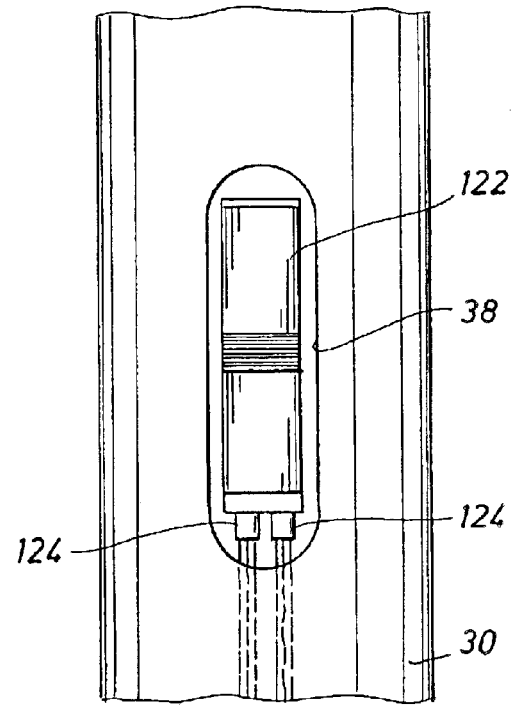

FIGS. 22a and 22b are schematic diagrams of an inductive coupler configuration within a run-in tool and tubular member in accord with the invention.

Figure 23:
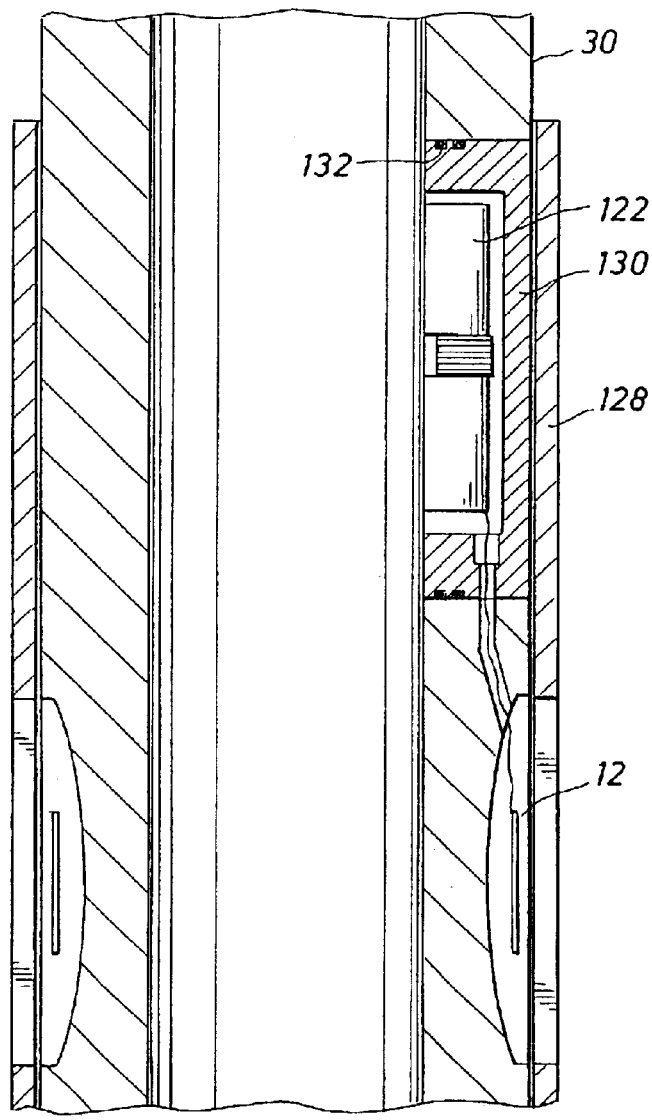

FIG. 23 is a cross-sectional view of an inductive coupler and shield configuration mounted within a tubular member in accord with the invention.

Figure 24:
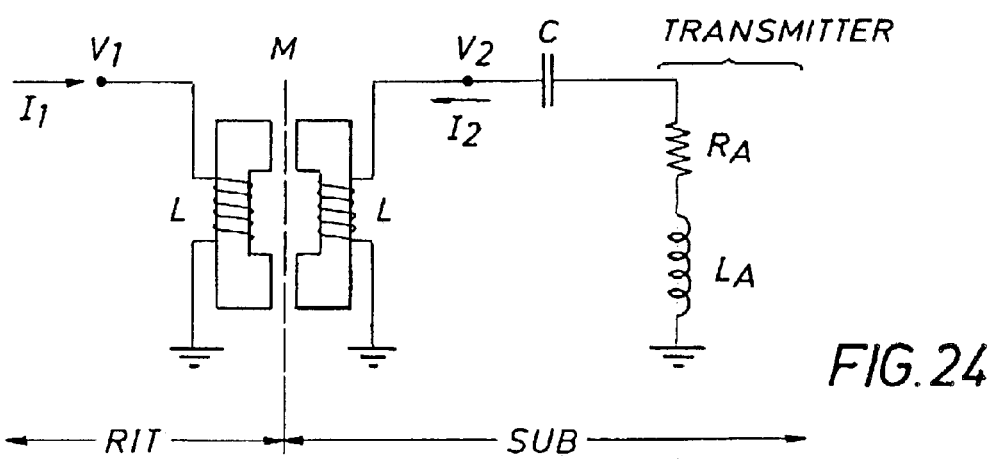

FIG. 24 is a schematic diagram of a simplified inductive coupler circuit in accord with the invention.

Figure 25:
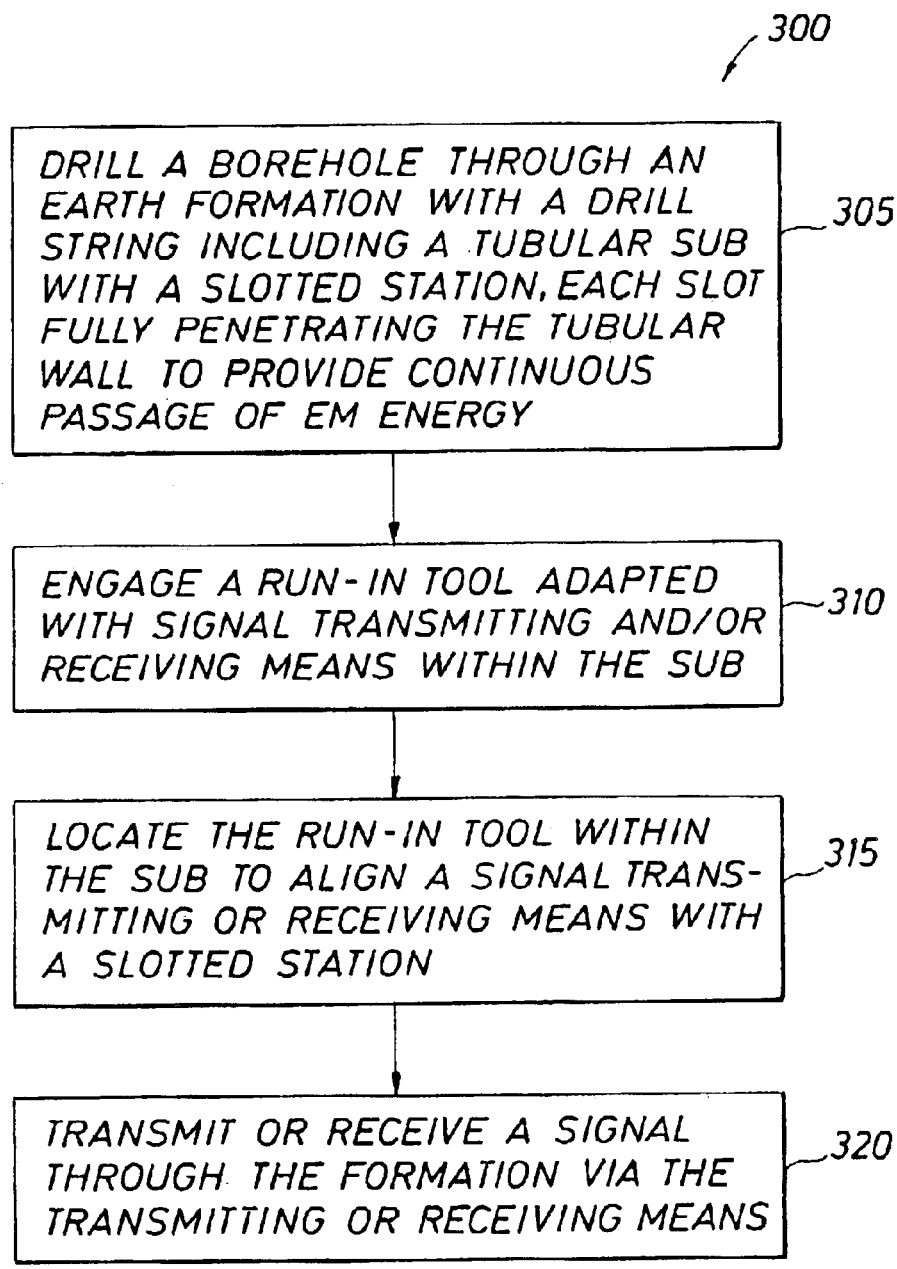

FIG. 25 is a flow chart illustrating a method for transmitting and/or receiving a signal through an earth formation in accord with the invention.

Figure 26:
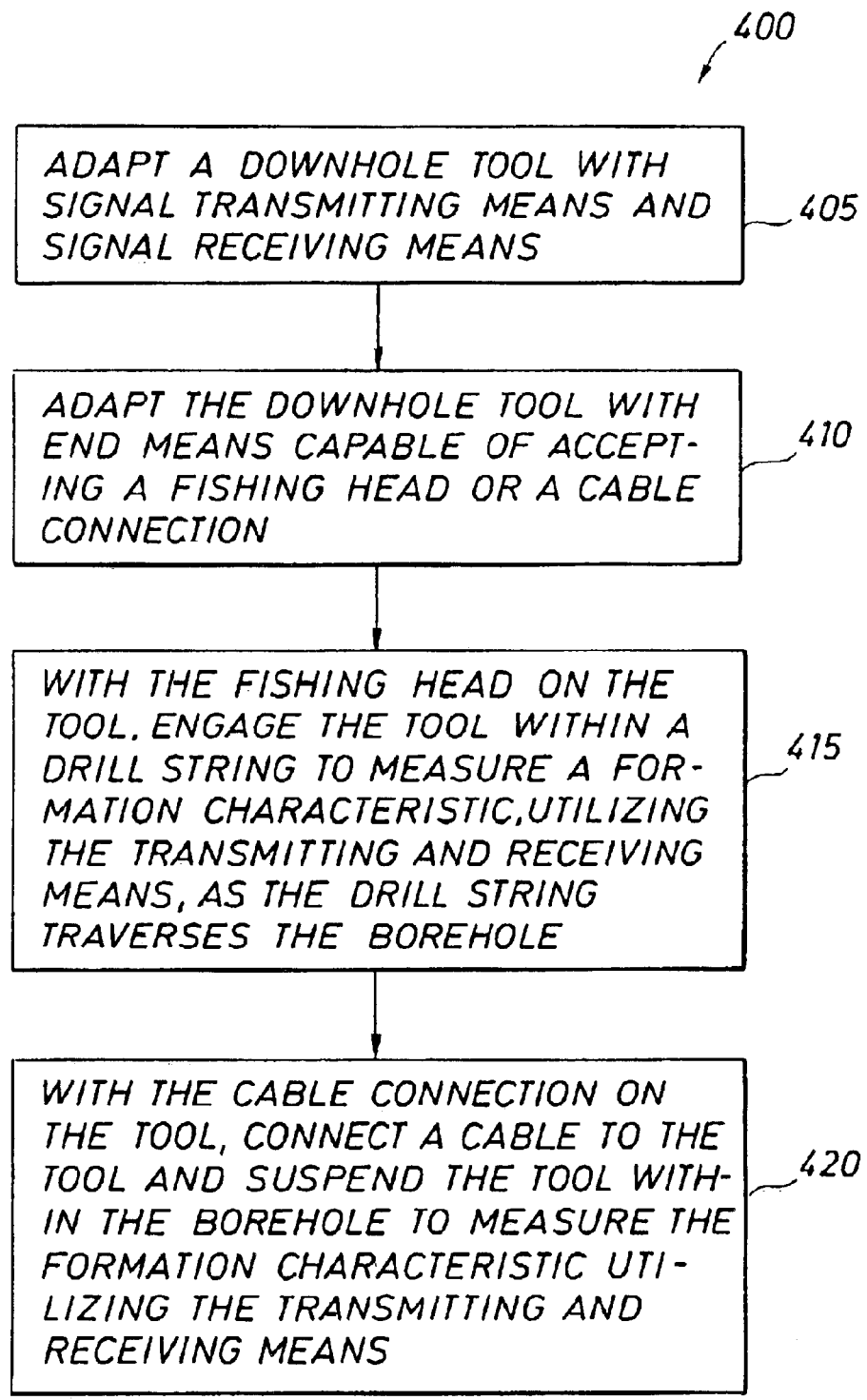

FIG. 26 is a flow chart illustrating a method for measuring a characteristic of an earth formation surrounding a borehole in accord with the invention.

Figure 27:
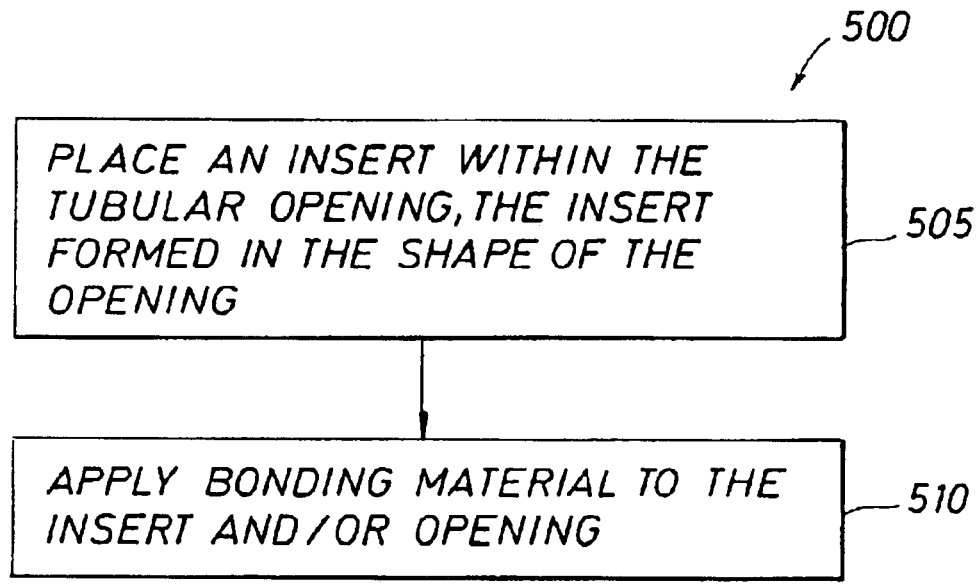

FIG. 27 is a flow chart illustrating a method for sealing an opening on the surface of a tubular member in accord with the invention.

Figure 28:
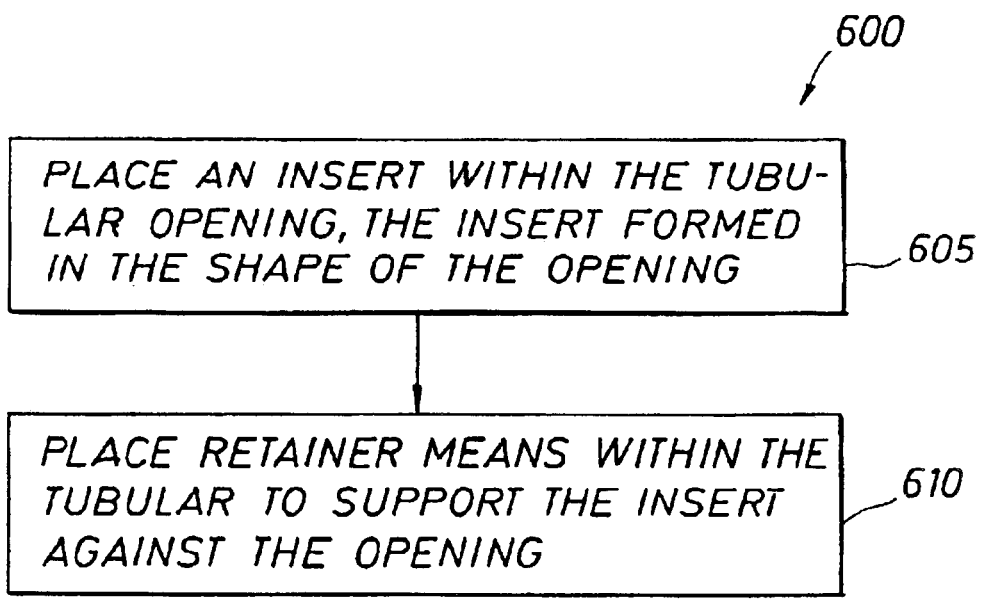

FIG. 28 is a flow chart illustrating a method for sealing a fully penetrating opening on a surface of a tubular member in accord with the invention.

4. DETAILED DESCRIPTION OF SPECIFIC EMBODIMENTS

In the interest of clarity, not all features of actual implementation are described in this specification. It will be appreciated that although the development of any such actual implementation might be complex and time-consuming, it would nevertheless be a routine undertaking for those of ordinary skill in the art having the benefit of this disclosure.

The apparatus of the invention consists of two main assets, a run-in tool (RIT) and a drill collar. Henceforth, the drill collar will be referred to as the sub.

4.1 RIT

Figure 1:
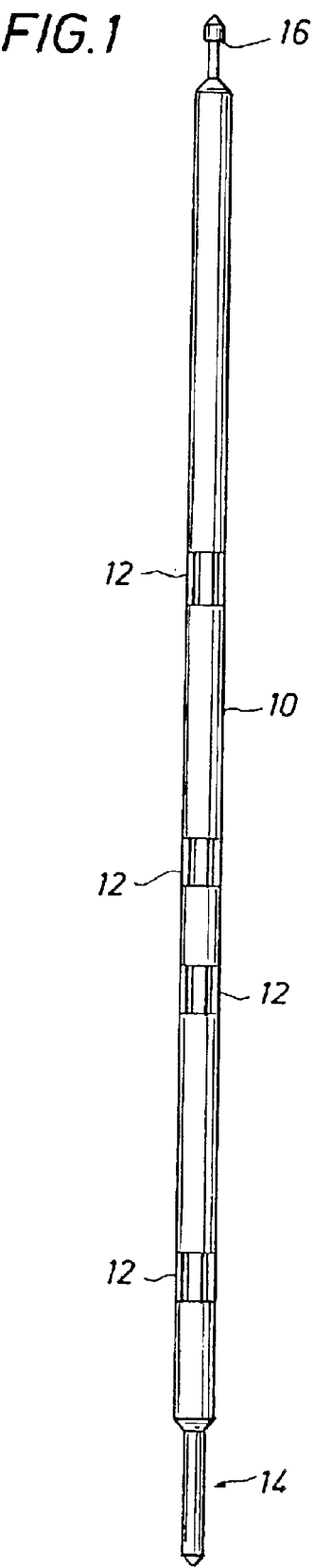
FIG. 1 is a schematic diagram of a run-in tool in accord with the invention.

FIG. 1 shows an embodiment of the RIT 10 of the invention. The RIT 10 is an elongated, small-diameter, metal mandrel that may contain one or more antennas 12, sources, sensors [sensor/detector are interchangeable terms as used herein], magnets, a gamma-ray detector/generator assembly, neutron-generating/detecting assembly, various electronics, batteries, a downhole processor, a clock, a read-out port, and recording memory (not shown).

The RIT 10 does not have the mechanical requirements of a drill collar. Thus, its mechanical constraints are greatly reduced. The RIT 10 has a landing mechanism (stinger) 14 on the bottom end and a fishing head 16 on the top. The fishing head 16 allows for the RIT 10 to be captured and retrieved from within a sub with the use of a conventional extraction tool such as the one described in U.S. Pat. No. 5,278,550 (assigned to the present assignee). An advantage of the fishable RIT 10 assembly is a reduction of Lost-In-Hole costs.

As shown in FIG. 2a, each antenna 12 on the RIT 10 consists of multi-turn wire loops encased in fiberglass-epoxy 18 mounted in a groove in the RIT 10 pressure housing and sealed with rubber over-molding 20. A feed-through 22 provides a passage for the antenna 12 wiring, leading to an inner bore 24 within the RIT 10. Each antenna 12 may be activated to receive or transmit an electromagnetic (EM) signal as known in the art.

The antennas 12 radiate an azimuthal electric field. Each antenna 12 is preferably surrounded by a stainless-steel shield 26 (similar to those described in U.S. Pat. No. 4,949,045, assigned to the present assignee) that has one or more axial slots 28 arrayed around the shield 26 circumference. FIG. 2b shows the axial slots 28 distributed around the circumference of the shield 26. The shields 26 are short-circuited at the axial ends into the metal mandrel body of the RIT 10. These shields 26 permit transverse electric (TE) radiation to propagate through while blocking transverse magnetic (TM) and transverse electromagnetic (TEM) radiation. The shields 26 also protect the antennas 12 from external damage. The RIT 10 electronics and sensor architecture resembles that described in U.S. Pat. No. 4,899,112 (assigned to the present assignee).

4.2 Sub

Figure 3:
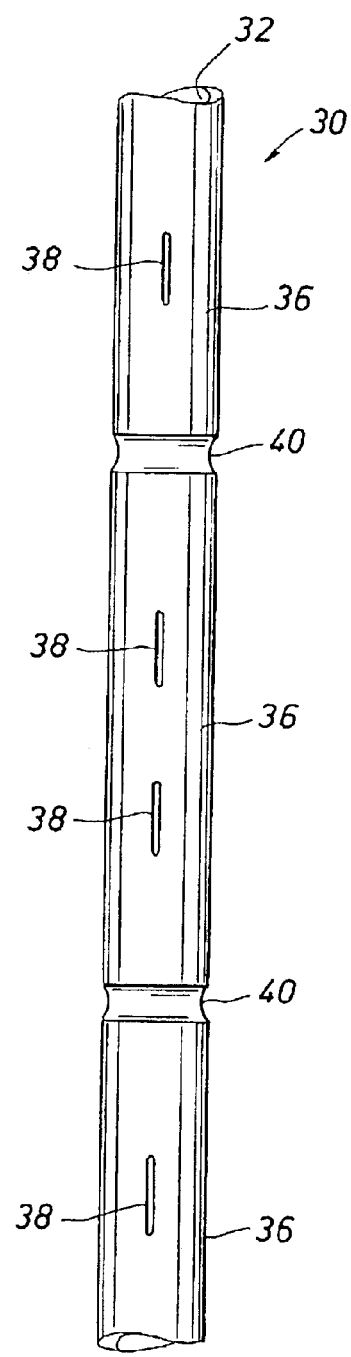
FIG. 3 is a schematic diagram of a tubular member with slotted stations in accord with the invention.

FIG. 3 shows an embodiment of a sub 30 of the invention. The sub 30 has an elongated body with tubular walls and a central bore 32. The sub 30 contains neither electronics nor sensors and is fully metallic, preferably formed from stainless steel. It is part of the normal bottom hole assembly (BHA), and it is in the hole with the drill string for the duration of the bit run. The sub 30 has normal threaded oilfield connections (pin and box) at each end (not shown).

The sub 30 includes one or more stations 36 with one or more axial slots 38 placed along the tubular wall. Each elongated axial slot 38 fully penetrates the tubular wall of the sub 30 and is preferably formed with fully rounded ends. Stress modeling has shown that rather long slots 38 may be formed in the sub 30 walls while still maintaining the structural integrity of the sub 30. Stress relief grooves 40 may be added to the OD of the sub 30, in regions away from the slot(s) 38, to minimize the bending moment on the slot(s) 38.

Each slot 38 provides a continuous channel for electromagnetic energy to pass through the sub 30. The slots 38 block TM radiation but allow the passage of TE radiation, albeit with some attenuation. The degree of attenuation of TE fields by the sub 30 depends on factors such as frequency, the number of slots, slot width, slot length, collar OD and ID, and the location and dimensions of the RIT 10 antenna. For example, FIG. 5 shows the sub 10 attenuation measured at 400 kHz with a 25-turn 1.75-inch diameter coil centered in 3.55-inch ID, 6.75-inch OD subs 30 with one or two slots 38 of different lengths and widths. As evident from FIG. 5, adding more slots 38 and making the slots longer or wider decreases the attenuation. However, with only one or two 0.5-inch wide 6–8 inch long slots 38, the sub 30 attenuation is already ~15 dB, which is sufficiently low for many applications.

Figure 4A:
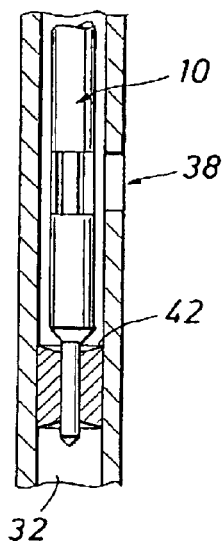
FIGS. 4a and 4b are schematic diagrams of a run-in tool engaged within a tubular member in accord with the invention.
Figure 4B:
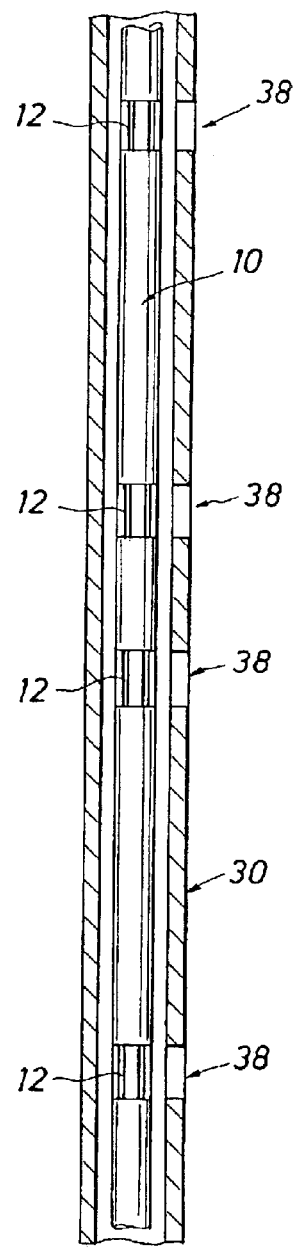

In operation, the RIT 10 is pumped down and/or lowered through the drillstring on cable at the end of the bit run and engaged inside the sub 30. The RIT 10 is received by a landing "shoe" 42 within the central bore 32 of the sub 30, as shown in FIG. 4a. FIG. 4b, shows how the RIT 10 is located in the sub 30 so that each antenna 12, source, or sensor is aligned with a slot 38 in the sub 30. The landing shoe 42 preferably also has a latching action to prevent any axial motion of the RIT 10 once it is engaged inside the sub 30.

Turning to FIG. 6, an embodiment of the invention includes a centralizer 44, which serves to keep the RIT 10 centered and stable within the sub 30, lowering shock levels and reducing the effects of tool motion on the measurement. One or more centralizers 44 may be mounted within the central bore 32 to constrain the RIT 10 and keep it from hitting the ID of the sub 30. One or more spring-blades 46 may also be mounted to extend from the centralizer 44 to provide positioning stability for the RIT 10. The spring-blades 46 are compressed against the RIT 10 when it is engaged within the sub 30. Bolts 48 with O-ring seals 50 may be used to hold the centralizer(s) 44 in the sub 30 while preserving the pressure barrier between the ID and the OD of the sub 30.

Alternatively, the centralizer 44 may be mounted on the RIT 10 rather than on the sub 30 (See FIG. 16). In this case, the centralizer 44 may be configured to remain in a retracted mode during the trip down, and to open when the RIT 10 lands in the sub 30. It will be understood that other centralizer 44 configurations may be implemented with the invention as known in the art.

The RIT 10 and sub 30 have EM properties similar to a coaxial cable, with the, RIT 10 acting as the inner conductor, and the sub 30 acting as the outer conductor of a coaxial cable. If the drilling mud is conductive, then the "coax" is lossy. If the drilling mud is oil based, the "coax" will have little attenuation. Parasitic antenna 12 coupling may take place inside of the sub 30 between receiver-receiver or transmitter-receiver. As described above, the shields 26 surrounding the antennas 12 are grounded to the mandrel of the RIT 10 to minimize capacitive and TEM coupling between them. Electrically balancing the antennas 12 also provides for TEM coupling rejection. The centralizers 44 may also be used as a means of contact to provide radio-frequency (rf) short-circuits between the RIT 10 and the sub 30 to prevent parasitic coupling. For example, small wheels with sharp teeth may be mounted on the centralizers 44 to ensure a hard short between the RIT 10 and the sub 30 (not shown).

4.3 Pressure Barrier

Since each slot 38 fully penetrates the wall of the sub 30, an insulating pressure barrier is used to maintain the differential pressure between the inside and the outside of the sub 30 and to maintain hydraulic integrity. There are a variety of methods for establishing a pressure barrier between the sub 30 ID and OD at the slotted station 36.

Turning to FIG. 7a, an embodiment of a sub 30 with a pressure barrier of the invention is shown. A cylindrical sleeve 52 is positioned within the central bore 32 of the sub 30 in alignment with the slot(s) 38. The sleeve 52 is formed of a material that provides transparency to EM energy. Useable materials include the class of polyetherketones described in U.S. Pat. No. 4,320,224, or other suitable resins. Victrex USA, Inc. of West Chester, Pa. manufactures one type called PEEK. Another usable compound is known as PEK. Cytec Fiberite, Greene Tweed, and BASF market other suitable thermoplastic resin materials. Another useable material is Tetragonal Phase Zirconia ceramic (TZP), manufactured by Coors Ceramics, of Golden, Colo. It will be appreciated by those skilled in the art that these and other materials may be combined to form a useable sleeve 52.

PEK and PEEK can withstand substantial pressure loading and have been used for harsh downhole conditions. Ceramics can withstand substantially higher loads, but they are not particularly tolerant to shock. Compositions of wound PEEK or PEK and glass, carbon, or KEVLAR may also be used to enhance the strength of the sleeve 52.

A retainer 54 and spacer 56 are included within the central bore 32 to support the sleeve 52 and provide for displacement and alignment with the slots 38. The sleeve 52 is positioned between the retainer 54 and spacer 56, which are formed as hollow cylinders to fit coaxially within the central bore 32. Both are preferably made of stainless steel. The retainer 54 is connected to the sleeve 52 at one end, with the sleeve 52 fitting coaxially inside the retainer 54. As the differential pressure increases within the ID of the sub 30 during operation, the sleeve 52 takes the loading, isolating the sub 30 from the pressure in the slotted region. Hydraulic integrity is maintained at the junction between the sleeve 52 and retainer 54 by an O-ring seal 53. A fitted "key" 55 is used to engage the sleeve 52 to the retainer 54, preventing one from rotating relative to the other (See FIG. 7a blow-up). An index pin 57 is fitted through the sub 30 and engaged to the free end of the retainer 54 to prevent the retainer from rotating within the bore 32 of the sub 30. Orings 59 are also placed within grooves on the OD of the retainer 54 to provide a hydraulic seal between the retainer 54 and the sub 30.

In operation, the internal sleeve 52 will likely undergo axial thermal expansion due to high downhole temperatures. Thus, it is preferable for the sleeve 52 to be capable of axial movement as it undergoes these changes in order to prevent buckling. The spacer 56 consists of an inner cylinder 60 within an outer cylinder 62. A spring 64 at one end of the OD of the inner cylinder 60 provides an axial force against the outer cylinder 62 (analogous to an automotive shock absorber). The outer cylinder 62 is connected to the sleeve 52 using the key 55 and O-ring seal 53 at the junction as described above and shown in the blow-up in FIG. 7a. The spring-loaded spacer 56 accounts for differential thermal expansion of the components. The sub 30 embodiment of FIG. 7a is shown connected to other tubular members by threaded oilfield connections 70.

For purposes of illustration, a sub 30 with only one slot 38 is shown in FIG. 7a. Other embodiments may include several sleeves 52 interconnected in the described manner to provide individual pressure barriers over multiple slotted stations 36 (not shown). With this configuration, only two O-ring 53 seals to the ID of the sub 30 are used over the entire slotted array section. This minimizes the risk involved with dragging the O-rings 53 over the slots 38 during assembly or repair. FIG. 7b shows a cross-section of the sub 30 (along line A—A of FIG. 7a) with a three-slot 38 configuration.

FIG. 8a shows another embodiment of a sub 30 with a pressure barrier of the invention. In this embodiment, the spring-loaded spacer 56 maintains the outer cylinder 62 abutted against the sleeve 52 and O-rings 68 are placed within grooves on the OD of the sleeve 52, preferably at both ends of the slot 38. The retainer 54 rests at one end against a shoulder or tab 58 formed on the wall of the central bore 32. FIG. 8*b* shows a cross-section of the sub 30 (along line B—B of FIG. 8*a*) with a three-slot 38 configuration.

In another embodiment of a pressure barrier of the invention, a sleeve 52 made out of PEEK or PEK, or glass, carbon, or KEVLAR filled versions of these materials, may be bonded to a metal insert (not shown), where the insert contains O-rings to seal against the sub 30 as described above. The metal insert could be mounted within the sub 30 as described above or with the use of fastener means or locking pins (not shown). The sleeve material may also be molded or wrapped onto the supporting insert. The fibers in the wrapped material can also be aligned to provide additional strength.

FIG. 9*a* shows another embodiment of a pressure barrier of the invention. In this embodiment, the cylindrical sleeve 52 is held in alignment with the slot(s) 38 by a metal retainer 72. The retainer 72 may be formed as a single piece with an appropriate slot 74 cut into it for signal passage as shown, or as independent pieces supporting the sleeve 52 at the top and bottom (not shown). The retainer 72 may be constrained from axial movement or rotation within the sub 30 by any of several means known in the art, including an index-pin mechanism or a keyed-jam-nut type arrangement (not shown). The slot 38 may also be filled with a protective insert as will be further described below. In operation, a RIT 10 is positioned within the sub 30 such that the antenna 12 is aligned with the slot(s) 38.

As shown in FIG. 9*b*, the retainer 72 is formed such that it extends into and reduces the ID of the sub 30 to constrain the RIT 10. Mudflow occurs through several channels or openings 76 in the retainer 72 and through the annulus 78 between the RIT 10 and the retainer 72. The retainer 72 in effect acts as a centralizer to stabilize the RIT 10 and to keep it from hitting the ID of the sub 30, lowering shock levels and increasing reliability.

FIG. 10 shows another embodiment of a pressure barrier of the invention. A sub 30 may be formed with a shop joint 80 so that the sleeve 52 can be inserted within the central bore 32. The sleeve 52 is formed as described above and provides a hydraulic seal using O-rings 82 within grooves at both ends on the OD of the sleeve 52. The sleeve 52 is restrained from axial movement within the central bore 32 by a lip 84 formed on one end of the two-piece sub 30 and by the end of the matching sub 30 joint. Since the sleeve 52 sits flush within a recess 86 in the ID of the sub 30, this configuration offers unrestricted passage to a large diameter FIT 10. This configuration also provides easy access to the sleeve 52 and slot(s) 38 for maintenance and inspection.

Turning to FIG. 11, another embodiment of a pressure barrier of the invention is shown. The slot 38 in the sub 30 is three-stepped, preferably with fully rounded ends. One of the steps provides a bearing shoulder 90 for an insert 92, and the other two surfaces form the geometry for an O-ring groove 94 in conjunction with the insert 92. A modified O-ring seal consists of an O-ring 96 stretched around the insert 92 at the appropriate step, with metal elements 98 placed on opposite sides of the O-ring 96. The metal elements 98 are preferably in the form of closed loops.

The sleeve 52 may be fitted within the sub 30 with one or more O-rings (not shown) to improve hydraulic integrity as described above. As shown in FIG. 11, the sleeve 52 may also have a slot 100 penetrating its wall to provide an unobstructed channel for any incoming or outgoing signal. The sleeve 52 may have a matching slot 100 for every slot 38 in the sub 30.

The insert 92 and sleeve 52 are preferably made of the dielectric materials described above to permit the passage of EM energy. However, if the sleeve 52 is configured with a slot 100, the sleeve 52 may be formed from any suitable material.

If the sleeve 52 is configured with a slot 100, the internal pressure of the sub 30 may push the insert 92 outward. The bearing shoulder 52 takes this load. As the internal pressure increases, the O-ring 96 pushes the metal elements 98 against an extrusion gap, which effectively closes off the gap. As a result, there is no room for extrusion of the O-ring 96. Since the metal is much harder than the O-ring material, it does not extrude at all. The modified geometry therefore creates a scenario where a soft element (the O-ring) provides the seal and a hard element (the metal loop) prevents extrusion, which is the ideal seal situation. In the event of pressure reversal, the sleeve 52 captures the insert 92 in the slot 38, preventing the insert 92 from being dislodged.

Other pressure barrier configurations may be implemented with the invention. One approach is the use of several individual sleeves 52 connected together by other retaining structures and restrained by a pressure-differential seal or a jam-nut arrangement (not shown). Another approach is the use of a long sleeve 52 to span multiple slotted stations 38 (not shown). Still another approach is the use of a sleeve 52 affixed to the OD of the sub 30 over the slotted region, or a combination of an interior and exterior sleeve 52 (not shown).

4.4 Slot Inserts

While the slotted stations of the invention are effective with fully open and unblocked slots 38, the operational life of the assembly may be extended by preventing debris and fluids from entering and eroding the slots 38 and the insulating sleeve 52. The slots 38 could be filled with rubber, an epoxy-fiberglass compound, or another suitable filler material to keep fluids and debris out while permitting signal passage.

An embodiment of a sub 30 with a tapered slot 38 is shown in FIG. 12*a*. The slot 38 is tapered such that the outer opening $W_1$ is narrower than the inner opening $W_2$, as shown in FIG. 12*b*. A tapered wedge 88 of insulating material (e.g., fiberglass epoxy) is inserted within the tapered slot 38. The wedge 88 may be bonded into the sub 30 with rubber. The rubber layer surrounds the wedge 88 and bonds it into the sub 30. An annulus of rubber may also be molded on the interior and/or exterior surface of the sub 30 to seal the wedge 88 within the slot 38.

4.5 Focusing Shield Structures

Measurements of the attenuation of the TE radiation from a simple coil-wound antenna 12 through a single slot 38 of reasonable dimensions show that the TE field is notably attenuated. This attenuation can be reduced, however, by using shielding around the antenna 12 to focus the EM fields into the slot 38.

Turning to FIG. 13*a*, an antenna 12 consisting of 25 turns of wire on a 1.75-inch diameter bobbin was mounted on a 1-inch diameter metal RIT 10 and positioned fully eccentered radially inside the bore of a 3.55-inch ID, 6.75-inch OD sub 30 against the slot 38 and centered vertically on the slot 38. The measured attenuation of the TE field between 25 kHz–2 MHz was a nearly constant 16.5 dB.

Turning to FIG. 13*b*, the same measurement was performed with the antenna 12 inside a thin shield 102 formed of a metallic tube with a 0.5-inch wide, 6-inch long slot 104 aligned with the slot 38 in the sub 30 (not shown). The antenna 12 was fully surrounded by the shield 102 except for the open slot 104 and placed inside the sub 30.

The attenuation with this assembly in the same sub 30 was 11.8 dB, a reduction of the attenuation of nearly 5 dB. FIGS. 13b and 13c respectively show how the shield 102 affects the magnetic and electric fields. The attenuation due to this shield 102 alone is minimal.

FIG. 14 shows another embodiment of a shielding structure of the invention. In this embodiment, the central bore 32 of the sub 30 is configured with a bracket structure 106 that serves as a focusing shield by surrounding the antenna 12 when the RIT 10 is engaged within the sub 30.

FIG. 15 shows another embodiment of a shielding structure of the invention. The mandrel of the RIT 10 has a machined pocket or cavity 108 in its body. A coil antenna 12 wound on a bobbin 110 made of dielectric material is mounted within the cavity 108. A ferrite rod may replace the dielectric bobbin 110. With this configuration, the body of the RIT 10 itself serves as a focusing shield. The hydraulic integrity of the RIT 10 is maintained by potting the antenna 12 with fiberglass-epoxy, rubber, or another suitable substance. The attenuation of a coil antenna 12 having 200 turns on a 0.875-inch diameter bobbin was measured for this assembly mounted the same way as described above in the same sub 30. The measured attenuation was only −7 dB. It will be appreciated by those skilled in the art that other types of sources/sensors may be housed within the cavity 108 of the RIT 10.

4.6 RIT/Sub Configurations

FIG. 16 shows another embodiment of the invention. A sub 30 of the invention is connected to another tubular 111 forming a section of a drillstring. The RIT 10 includes an antenna 12, a stinger 14 at the lower end, and a fishing head 16 at the top end. The stinger 14 is received by the landing shoe 42 on the sub 30, which serves to align the antenna 12 with the slotted station 36. As above, the RIT 10 of this embodiment includes various electronics, batteries, a downhole processor, a clock, a read-out port, memory, etc. (not shown) in a pressure housing. The RIT 10 may also incorporate various types of sources/sensors as known in the art.

4.6.1 RIT with Modulator

The RIT 10 of FIG. 16 is also equipped with a modulator 116 for signal communication with the surface. As known in the art, a useable modulator 116 consists of a rotary valve that operates on a continuous pressure wave in the mud column. By changing the phase of the signal (frequency modulation) and detecting these changes, a signal can be transmitted between the surface and the RIT 10. With this configuration, one can send the RIT 10 through the drillstring to obtain measurement data (e.g., resistivity or gamma-ray counts) of formation characteristics and to communicate such data to the surface in real-time. Alternatively, all or some of the measurement data may be stored downhole in the RIT 10 memory for later retrieval. The modulator 116 may also be used to verify that the RIT 10 is correctly positioned in the sub 30, and that measurements are functioning properly. It will be appreciated by those skilled in the art that a modulator 116 assembly may be incorporated with all of the RIT/sub implementations of the invention.

FIG. 17 shows another embodiment of the invention. The subs 30 and RITs 10 of the invention may be used to communicate data and/or instructions between the surface and a remote tool 112 located along the drill string. For purposes of illustration, the tool 112 is shown with a bit box 113 at the bottom portion of a drive shaft 114. The drive shaft 114 is connected to a drilling motor 115 via an internal transmission assembly (not shown) and a bearing section 117. The tool 112 also has an antenna 12 mounted on the bit box 113. The motor 115 rotates the shaft 114, which rotates the bit box 113, thus rotating the antenna 12 during drilling.

With the configuration of FIG. 17, the RIT 10 may be engaged within the sub 30 at the surface or sent through the drill string when the sub 30 is at a desired downhole position. Once engaged, a wireless communication link may be established between the antenna 12 on the RIT 10 and the antenna 12 on the tool 112, with the signal passing through the slotted station 36. In this manner, real-time wireless communication between the surface and the downhole tool 112 may be established. It will be appreciated by those skilled in the art that other types of sensors and/or signal transmitting/receiving devices may be mounted on various types of remote tools 112 for communication with corresponding devices mounted on the RIT 10.

4.6.2 Nuclear Magnetic Resonance Sensing

It is known that when an assembly of magnetic moments such as those of hydrogen nuclei are exposed to a static magnetic field they tend to align along the direction of the magnetic field, resulting in bulk magnetization. By measuring the amount of time for the hydrogen nuclei to realign their spin axes, a rapid nondestructive determination of porosity, movable fluid, and permeability of earth formations is obtained. See A. Timur, *Pulsed Nuclear Magnetic Resonance Studies of Porosity, Movable Fluid, and Permeability of Sandstones*, JOURNAL OF PETROLEUM TECHNOLOGY, June 1969, p. 775. U.S. Pat. No. 4,717,876 describes a nuclear magnetic resonance well logging instrument employing these techniques.

A determination of formation porosity from magnetic resonance may be obtained with a non-magnetic sub 30 of the invention as shown in FIG. 18. The sub 30 can be formed of the typical high-strength non-magnetic steel used in the industry. The RIT 10 contains the electronics, batteries, CPU, memory, etc., as described above. Opposing permanent magnets 118 contained in the RIT 10 provide the magnetic field. A rf coil 120 is mounted between the magnets 118 for generating a magnetic field in the same region to excite nuclei of the formation vicinity. The design of the rf coil 120 is similar to the antennas 12 described above in being a multi-turn loop antenna with a central tube for through wires and mechanical strength. The permanent magnets 118 and rf coil 120 are preferably housed in a non-magnetic section of the sub 30 that has axial slots 38 with a pressure barrier (not shown) of the invention.

With a non-magnetic sub 30, the static magnetic fields $B_0$ from the permanent magnets 118 penetrate into the surrounding formation to excite the nuclei within the surrounding formation. The coil 120 in the RIT 10 provides a rf magnetic field $B_1$, which is perpendicular to $B_0$ outside of the sub 30. The rf coil 120 is positioned in alignment with the axial slot(s) 38 in the sub 30.

A magnetic resonance measurement while tripping may be more complicated in comparison to propagation resistivity measurements due to various factors, including: an inherently lower signal-to-noise ratio, permanent magnet form factors, rf coil efficiency, high Q antenna tuning, high power demands, and a slower logging speed.

4.6.3 Gamma-Ray Measurement

It is known that gamma ray transport measurements through a formation can be used to determine its characteristics such as density. The interaction of gamma rays by Compton scattering is dependent only upon the number density of the scattering electrons. This in turn is directly proportional to the bulk density of the formation. Conventional logging tools have been implemented with detectors and a source of gamma rays whose primary mode of interaction is Compton scattering. See U.S. Pat. No. 5,250, 806, assigned to the present assignee. Gamma ray formation measurements have also been implemented in LWT technology. See *Logging while tripping cuts time to run gamma ray*, OIL & GAS JOURNAL, June 1996, pp. 65–66. The present invention may be used to obtain gamma-ray measurements as known in the art, providing advantages over known implementations.

The subs 30 of the invention provide the structural integrity required for drilling operations while also providing a low-density channel for the passage of gamma rays. Turning to FIG. 4b, this configuration is used to illustrate a gamma-ray implementation of the invention. In this implementation, a RIT 10 is equipped with a gamma-ray source and gamma-ray detectors (not shown) of the type known in the art and described in the '806 patent. The antennas 12 of FIG. 4b would be replaced with a gamma-ray source and gamma-ray detectors (not shown).

Two gamma-ray detectors are typically used in this type of measurement. The gamma-ray detectors are placed on the RIT 10 at appropriate spacings from the source as known in the art. The slotted stations 36 are also appropriately placed to match the source and detector positions of the RIT 10. Calibration of the measurement may be required to account for the rays transmitted along the inside of the sub 30. The gamma-ray detectors may also be appropriately housed within the RIT 10 to shield them from direct radiation from the source as known in the art.

Turning to FIG. 14, this configuration is used to illustrate another gamma-ray implementation of the invention. With the RIT 10 equipped with the described gamma-ray assembly and eccentered toward the slots 38, this configuration will capture the scattered gamma rays more efficiently and provide less transmission loss.

4.6.4 Resistivity Measurement

The invention may be used to measure formation resistivity using electromagnetic propagation techniques as known in the art, including those described in U.S. Pat. Nos. 5,594,343 and 4,899,112 (both assigned to the present assignee). FIGS. 19a and 19b show two RIT 10/sub 30 configurations of the invention. A pair of centrally located receiver antennas Rx are used to measure the phase shift and attenuation of EM waves. Look-up tables may be used to determine phase shift resistivity and attenuation resistivity. Transmitter antennas Tx are placed above and below the receiver antennas Rx, either in the configuration shown in FIG. 19a, which has two symmetrically placed transmitter antennas Tx, or in the configuration shown in FIG. 19b, which has several transmitter antennas Tx above and below the receiver antennas Rx. The architecture of FIG. 19a can be used to make a borehole compensated phase-shift and attenuation resistivity measurement, while the multiple Tx spacings of FIG. 19b can measure borehole compensated phase-shift and attenuation with multiple depths of investigation. It will be appreciated by those skilled in the art that other source/sensor configurations and algorithms or models may be used to make formation measurements and determine the formation characteristics.

4.7 Inductively-Coupled RIT/Sub

Turning to FIG. 20, other embodiments of a sub 30 and RIT 10 of the invention are shown. The sub 30 contains one or more integral antennas 12 mounted on the OD of the elongated body for transmitting and/or receiving electromagnetic energy. The antennas 12 are embedded in fiberglass epoxy, with a rubber over-molding as described above. The sub 30 also has one or more inductive couplers 122 distributed along its tubular wall.

The RIT 10 has a small-diameter pressure housing such as the one described above, which contains electronics, batteries, downhole processor, clocks, read-out port, recording memory, etc., and one or more inductive couplers 122 mounted along its body.

As shown in FIG. 21, the RIT 10 is eccentered inside the sub 30 so that the inductive coupler(s) 122 in the RIT 10 and the inductive coupler(s) 122 in the sub 30 are in close proximity. The couplers 120 consist of windings formed around a ferrite body as known in the art. Feed-throughs 124 connect the antenna 12 wires to the inductive coupler 122 located in a small pocket 126 in the sub 30. A metal shield 128 with vertical slots covers each antenna 12 to protect it from mechanical damage and provide the desired electromagnetic filtering properties as previously described. Correctly positioning the RIT 10 inside the sub 30 improves the efficiency of the inductive coupling. Positioning is accomplished using a stinger and landing shoe (See FIG. 4a) to eccenter the RIT 10 within the sub 30. It will be appreciated by those skilled in the art that other eccentering systems may be used to implement the invention.

As shown in FIG. 22a, the inductive couplers 122 have "U" shaped cores made of ferrite. The ferrite core and windings are potted in fiberglass-epoxy, over molded with rubber 131, and mounted within a coupler package 130 formed of metal. The coupler package 130 may be formed of stainless steel or a non-magnetic metal. Standard O-ring seals 132 placed around the inductive coupler package 130 provide a hydraulic seal. The inductive couplers 122 in the RIT 10 may also be potted in fiberglass-epoxy and over molded with rubber 131. A thin cylindrical shield made of PEEK or PEK may also be placed on the OD of the sub 38 to protect and secure the coupler package 130 (not shown).

In operation, there will be a gap between the inductive couplers 122 in the RIT 10 and the sub 30, so the coupling will not be 100% efficient. To improve the coupling efficiency, and to lessen the effects of mis-alignment of the pole faces, it is desirable for the pole faces to have as large a surface area as possible.

FIG. 22b shows a 3.75-inch long by 1-inch wide slot 38 in the sub 30. The pole face for this inductive coupler 122 is 1.1-inches long by 0.75-inch wide, giving an overlap area of 0.825 square inches. This configuration maintains a high coupling efficiency and reduces the effects due to the following: movement of the RIT 10 during drilling or tripping, variations in the gap between the inductive couplers 122, and variations in the angle of the RIT 10 with respect to the sub 30. Another advantage of a long slot 38 design is that it provides space for the pressure feed-throughs 124 in the inductive coupler package 130.

Antenna tuning elements (capacitors) may also be placed in this package 130 if needed. It will be appreciated by those skilled in the art that other aperture configurations may be formed in the walls of the sub 30 to achieve the desired inductive coupling, such as the circular holes shown in FIG. 20.

Since the pressure inside the sub 30 will be 1–2 Kpsi higher than outside the sub 30 in most cases, the inductive coupler package 130 should be mechanically held in place. Turning to FIG. 23, the antenna shield 128 can be used to retain the inductive coupler package 130 in place. The shield 128 having slots over the antenna 12 as described above, but solid elsewhere. The solid portion retains the inductive coupler package 130 and takes the load from the differential pressure drop. Tabs may also be placed on the outside of the inductive coupler package 130 to keep it from moving inward (not shown). The shield 128 may also be threaded on its ID, with the threads engaging matching "dogs" on the sub 30 (not shown).

FIG. 24 shows a simple circuit model for an embodiment of the inductive coupler and transmitter antenna of the invention. On the RIT 10 side, the current is $I_1$, and the voltage is $V_1$. On the sub 30 side, the current is $I_2$ and the voltage is $V_2$. The mutual inductance is M, and the self-inductance of each half is L. This inductive coupler is symmetric with the same number of turns on each half. With the direction of $I_2$ defined in FIG. 24, the voltage and currents are related by $V_1 = j\omega LI_1 + j\omega MI_2$ and $V_2 = j\omega MI_1 + j\omega LI_2$. The antenna impedance is primarily inductive ($L_A$) with a small resistive part ($R_A$), $Z_A = R_A + j\omega L_A$. Typically the inductive impedance is about 100 Ω, while the resistive impedance is about 10 Ω. A tuning capacitor (C) may be used to cancel the antenna inductance, giving a RIT side impedance $Z_2 = R_A + j\omega L_A - j/\omega C \sim R_A$. The ratio of the current delivered to the antenna to the current driving the inductive coupler is $I_2/I_1 = -j\omega M/(j\omega L + R_A + j\omega L_A - j/\omega C)$. The inductive coupler has many turns and a high permeability core, so $L \gg L_A$ and $\omega L \gg\gg R_A$. To good approximation, $I_2/I_1 = \sim -M/L$ (the sign being relative to the direction of current flow in FIG. 24).

4.8 Implementations of the Invention

As described above, the RIT 10 may be equipped with internal data storage means such as conventional memory and other forms of the kind well known in the art or subsequently developed. These storage means may be used to communicate data and/or instructions between the surface and the downhole RIT 10. Received signal data may be stored downhole within the storage means and subsequently retrieved when the RIT 10 is returned to the surface. As known in the art, a computer (or other recording means) at the surface keeps track of time versus downhole position of the sub so that stored data can be correlated with a downhole location. Alternatively, the signal data and/or instructions lo may be communicated in real-time between the surface and the RIT 10 by LWD/MWD telemetry as known in the art.

FIG. 25 illustrates a flow diagram of a method 300 for transmitting and/or receiving a signal through an earth formation in accord with the invention. The method comprises drilling a borehole through the earth formation with a drill string, the drill string including a sub having an elongated body with tubular walls and including at least one station having at least one slot formed therein, each at least one slot fully penetrating the tubular wall to provide a continuous channel for the passage of electromagnetic energy 305; engaging a run-in tool within the sub, the run-in tool being adapted with signal transmitting means and/or signal receiving means 310; locating the run-in tool within the sub such that at least one signal transmitting or receiving means is aligned with at least one slotted station on the sub 315; and transmitting or receiving a signal through the formation, respectively via the transmitting or receiving means 320.

FIG. 26 illustrates a flow diagram of a method 400 for measuring a characteristic of an earth formation surrounding a borehole in accord with the invention. The method comprises adapting a downhole tool with at least one signal transmitting means and at least one signal receiving means 405; adapting the downhole tool with end means capable of accepting a fishing head or a cable connection 410; and with the fishing head on the tool, engaging the tool within a drill string to measure the formation characteristic, utilizing the transmitting and receiving means, as the drill string traverses the borehole; with the cable connection on the tool, connecting a cable to the tool and suspending the tool within the borehole to measure the formation characteristic utilizing the transmitting and receiving means 420.

The method 400 of FIG. 26 may be implemented with the run-in tools 10 and subs 30 of the invention. The run-in tool may be configured with an end segment or cap (not shown) adapted to receive the previously described fishing head or a cable connection. With the fishing head connected to the run-in tool, the tool may be used in accord with the disclosed implementations. With the cable connection, the run-in tool may be used as a memory-mode wireline tool.

It will be understood that the following methods for sealing an opening or slot on the surface of a tubular are based on the disclosed pressure barriers and slot inserts of the invention.

FIG. 27 illustrates a flow diagram of a method 500 for sealing an opening on the surface of a tubular, wherein the tubular has an elongated body with tubular walls and a central bore. The method comprises placing an insert within the opening, the insert being formed in the shape of the opening 505; and applying a bonding material to the insert and/or opening to bond the insert within the opening 510.

FIG. 28 illustrates a flow diagram of a method 600 for sealing a fully penetrating opening on the surface of a tubular having an elongated body with tubular walls and a central bore. The method comprises placing an insert within the opening, the insert being formed in the shape of the opening 605, and placing retainer means within the tubular to support the insert against the opening 610.

While the methods and apparatus of this invention have been described as specific embodiments, it will be apparent to those skilled in the art that variations may be applied to the structures and in the steps or in the sequence of steps of the methods described herein without departing from the concept and scope of the invention. For example, the invention may be implemented in a configuration wherein one RIT/sub unit is equipped to measure a combination of formation characteristics, including resistivity, porosity and density. All such similar variations apparent to those skilled in the art are deemed to be within this concept and scope of the invention as defined by the appended claims.

What is claimed is:

1. A system for receiving a run-in tool, comprising:
a sub having an elongated body with tubular walls and a central bore, the sub being adapted to form a portion of a length of drill string;
the sub including at least one inductive coupling means disposed thereon;
the sub including at least one source or sensor disposed thereon;
the run-in tool including at least one inductive coupling means disposed thereon; and
the run-in tool being adapted for transit through the drill string and into the central bore of the sub.

2. The system of claim 1, wherein the run-in tool is adapted to be pumped through the drill string or conveyed on a cable within the drill string.

3. The system of claim 1, wherein the sub is adapted to center the run-in tool within the bore when the tool is located within the bore.

4. The system of claim 1, wherein the at least one inductive coupling means disposed on the sub is electrically connected to at least one source or sensor on the sub.

5. The system of claim 1, wherein the at least one source is adapted to transmit electromagnetic energy and the at least one sensor is adapted to receive electromagnetic energy.

6. The system of claim 1, wherein the sub is adapted to locate the run-in tool within the central bore such that at least one inductive coupling means on the run-in tool is aligned with at least one inductive coupling means on the sub.

7. The system of claim 1, wherein the run-in tool comprises modulator means for remote communication when the tool is disposed within the sub.

8. The system of claim 1, wherein the run-in tool comprises internal data storage means.

9. The system of claim 1, wherein the sub is adapted to retain the run-in tool within the central bore when said tool is disposed therein.

10. The system of claim 1, the sub body further comprising at least one opening formed therein such that the opening penetrates the tubular wall to provide a continuous channel for the passage of a signal.

11. The system of claim 10, the sub further comprising means to provide a pressure barrier between the interior and exterior of the tubular wall, the means located within the central bore in alignment with the at least one opening.

12. The system of claim 11, wherein the means to provide a pressure barrier comprises a sleeve formed of a material providing transparency to electromagnetic energy.

13. The system of claim 10, wherein the at least one opening comprises an insert or filler material disposed therein.

14. The system of claim 11, wherein the pressure barrier means is adapted for displacement within the sub bore.

15. A system for receiving a run-in tool, comprising:
a sub having an elongated body with tubular walls and a central bore, the sub being adapted to connect with another tubular;
the sub including an inductive coupler disposed thereon;
the run-in tool including an inductive coupler disposed thereon;
the sub including at least one source or sensor disposed thereon; and
the sub adapted to receive end house the run-in tool;
wherein said inductive couplers are adapted for inductive coupling with one another.

16. The system of claim 15, wherein the run-in tool is adapted to be pumped into the sub or conveyed on a cable within the sub.

17. The system of claim 15, wherein the sub is adapted to eccenter the run-in tool within the bore when the tool is located therein.

18. The system of claim 15, wherein the inductive coupler disposed on the sub is electrically linked to the at least one source or sensor on the sub.

19. The system of claim 15, wherein the at least one source or sensor is respectively adapted to transmit electromagnetic energy or to detect electromagnetic energy.

20. The system of claim 15, wherein the sub is adapted to locate the run-in tool within the central bore such that the inductive coupler on the run-in tool is aligned with the inductive coupler on the sub.

21. The system of claim 15, wherein the run-in tool comprises modulator means for remote communication when the tool is disposed within the sub.

22. The system of claim 15, the sub body further comprising at least one opening formed therein such that the opening penetrates the tubular wall to provide a continuous channel for the passage of a signal.

23. The system of claim 22, the sub further comprising means to provide a pressure barrier between the interior and exterior of the tubular wall, the means located within the central bore in alignment with the at least one opening.

24. The system of claim 23, wherein the pressure barrier means comprises a sleeve formed of a material providing transparency to electromagnetic energy.

25. The system of claim 22, wherein the at least one opening comprises an insert or filler material disposed therein.

26. The system of claim 23, wherein the pressure barrier means is adapted for displacement within the sub bore.

27. A system for receiving a run-in tool, comprising:
a sub adapted for subsurface disposal and having an elongated body with tubular walls and a central bore;
the sub including an inductive coupler disposed thereon;
the run-in tool including an inductive coupler disposed thereon;
the sub including at least one source or sensor disposed thereon; and
the run-in tool adapted for transit into the sub bore.

28. The system of claim 27, wherein the run-in tool is adapted to be pumped into the sub or conveyed on a cable within the sub.

29. The system of claim 27, wherein the sub is adapted to eccenter the run-in tool within the bore when the tool is located therein.

30. The system of claim 27, wherein the inductive coupler disposed on the sub is electrically linked to the at least one source or sensor on the sub.

31. The system of claim 27, wherein the at least one source or sensor is respectively adapted to transmit electromagnetic energy or to detect electromagnetic energy.

32. The system of claim 27, wherein the sub is adapted to locate the run-in tool within the central bore such that the inductive coupler on the run-in tool is aligned with the inductive coupler on the sub.

33. The system of claim 27, wherein the run-in tool comprises modulator means for remote communication when the tool is disposed within the sub.

34. The system of claim 27, the sub body further comprising at least one opening formed therein such that the opening penetrates the tubular wall to provide a continuous channel for the passage of a signal.

35. The system of claim 34, the sub further comprising means to provide a pressure barrier between the interior and exterior of the tubular wall, the means located within the central bore in alignment with the at least one opening.

36. The system of claim 35, wherein the pressure barrier means comprises a sleeve formed of a material providing transparency to electromagnetic energy.

37. The system of claim 34, wherein the at least one opening comprises an insert or filler material disposed therein.

38. The system of claim 35, wherein the pressure barrier means is adapted for displacement within the sub bore.

* * * * *